US012705952B2

(12) United States Patent
Patton et al.

(10) Patent No.: US 12,705,952 B2
(45) **Date of Patent: *Aug. 11, 2026**

(54) UNIFIED JACKPOT SYSTEM FOR PERSONALIZED JACKPOTS

(71) Applicant: Aristocrat Technologies, Inc., Las Vegas, NV (US)

(72) Inventors: Anthony Patton, Las Vegas, NV (US); Jeremiah O'Hara, Las Vegas, NV (US); Sean Gribbin, Santa Ana, CA (US)

(73) Assignee: Aristocrat Technologies, Inc., Las Vegas, NV (US)

( * ) Notice: Subject to any disclaimer, the term of this patent is extended or adjusted under 35 U.S.C. 154(b) by 360 days.

This patent is subject to a terminal disclaimer.

(21) Appl. No.: 18/450,570

(22) Filed: Aug. 16, 2023

(65) Prior Publication Data

US 2024/0062624 A1 Feb. 22, 2024

Related U.S. Application Data

(60) Provisional application No. 63/399,912, filed on Aug. 22, 2022.

(51) Int. Cl.
*G07F 17/32* (2006.01)

(52) U.S. Cl.
CPC ................................ *G07F 17/3258* (2013.01)

(58) Field of Classification Search
CPC .................................................. G07F 17/3258
See application file for complete search history.

(56) References Cited

U.S. PATENT DOCUMENTS

| | | | |
|---|---|---|---|
| 6,241,608 | B1 | 6/2001 | Torango |
| 8,523,665 | B2 | 9/2013 | Baerlocher |
| 8,821,296 | B1 | 9/2014 | Smurfit |
| 9,965,922 | B2 | 5/2018 | Constable |

(Continued)

OTHER PUBLICATIONS

"Light & Wonder Illuminates New Games and Technology at NIGA 2022", businesswire, dated Apr. 21, 2022, 8 pages.

(Continued)

*Primary Examiner* — Jasson H Yoo
(74) *Attorney, Agent, or Firm* — Blank Rome LLP

(57) ABSTRACT

The innovations herein concern flexible and omnichannel unified jackpot awarding systems. In particular, a hosted gaming service may provide a unified jackpot awarding system that is compatible and combinable with a variety of different gaming ecosystems, such as land-based gaming environments and online or "iGaming" environments. Specifically, the unified jackpot system may include a gaming device identifier (GID), a contributor identifier (CID), and/or a contributor type property to aid in the identifying and tracking of jackpots awarded, e.g., to multiple players playing on multiple devices and in multiple games across land-based and/or online gaming environments. Each player and device may be linked with their own gameplay session (e.g., via the use of QR codes, digital wallets, biometric information, or the like). With this linkage established, the unified jackpot system can track, monitor, and award jackpots to players using different types of gaming devices across different gaming ecosystems and/or different games.

18 Claims, 13 Drawing Sheets

(56) References Cited

U.S. PATENT DOCUMENTS

| | | | | |
|---|---|---|---|---|
| 10,026,266 | B1 | 7/2018 | Shahak | |
| 11,176,777 | B2 | 11/2021 | Pariseau | |
| 11,380,164 | B2 | 7/2022 | Hughes | |
| 11,803,848 | B1 | 10/2023 | Gupta | |
| 2001/0003710 | A1 | 6/2001 | Abramopoulos | |
| 2003/0078101 | A1 | 4/2003 | Schneider | |
| 2003/0148807 | A1 | 8/2003 | Acres | |
| 2008/0090651 | A1 | 4/2008 | Baerlocher | |
| 2008/0108401 | A1 | 5/2008 | Baerlocher | |
| 2009/0075712 | A1 | 3/2009 | Englman | |
| 2009/0247267 | A1 | 10/2009 | Acres | |
| 2010/0120525 | A1 | 5/2010 | Baerlocher | |
| 2010/0261524 | A1 | 10/2010 | Pawloski | |
| 2010/0323781 | A1 | 12/2010 | Acres | |
| 2011/0124404 | A1 | 5/2011 | Muir | |
| 2011/0201403 | A1 | 8/2011 | Jaffe | |
| 2011/0201416 | A1 | 8/2011 | Jaffe | |
| 2011/0269548 | A1 | 11/2011 | Barclay | |
| 2012/0149461 | A1 | 6/2012 | Walker | |
| 2012/0252562 | A1 | 10/2012 | Aoki | |
| 2013/0203476 | A1 * | 8/2013 | Kenny | G07F 17/326 273/274 |
| 2013/0324233 | A1 * | 12/2013 | Constable | G07F 17/3293 463/27 |
| 2014/0004932 | A1 | 1/2014 | Baerlocher | |
| 2014/0011571 | A1 | 1/2014 | Roper | |
| 2014/0080590 | A1 | 3/2014 | Link | |
| 2014/0248941 | A1 | 9/2014 | Nelson | |
| 2014/0256417 | A1 | 9/2014 | Maddhali | |
| 2014/0274349 | A1 | 9/2014 | Spencer | |
| 2014/0364203 | A1 | 12/2014 | Nelson | |
| 2015/0032520 | A1 | 1/2015 | Randel | |
| 2015/0072762 | A1 | 3/2015 | Curtin | |
| 2015/0072776 | A1 | 3/2015 | Nicely | |
| 2015/0072777 | A1 | 3/2015 | Decasa | |
| 2015/0072781 | A1 | 3/2015 | Nicely | |
| 2015/0072782 | A1 | 3/2015 | Nicely | |
| 2015/0072783 | A1 | 3/2015 | Nicely | |
| 2015/0243137 | A1 | 8/2015 | Borissov | |
| 2015/0254932 | A1 | 9/2015 | Boese | |
| 2015/0317878 | A1 | 11/2015 | Saltiel | |
| 2016/0005271 | A1 | 1/2016 | Vasquez | |
| 2016/0125521 | A1 | 5/2016 | Randel | |
| 2016/0180647 | A1 | 6/2016 | Webb | |
| 2016/0314657 | A1 | 10/2016 | Buchholz | |
| 2017/0221309 | A1 | 8/2017 | Hughes | |
| 2018/0253940 | A1 | 9/2018 | Borissov | |
| 2018/0322723 | A1 | 11/2018 | Lemay | |
| 2020/0219364 | A1 | 7/2020 | Czyzewski | |
| 2020/0402361 | A1 | 12/2020 | Hughes | |
| 2020/0402362 | A1 | 12/2020 | De Waal | |
| 2021/0019992 | A1 | 1/2021 | Toohey | |
| 2021/0407249 | A1 | 12/2021 | Acres | |
| 2022/0148384 | A1 | 5/2022 | Mcphail | |
| 2022/0284766 | A1 | 9/2022 | Hughes | |
| 2022/0292925 | A1 | 9/2022 | Hughes | |
| 2022/0292926 | A1 | 9/2022 | Wang | |
| 2023/0065287 | A1 | 3/2023 | Paulsen | |
| 2023/0079094 | A1 | 3/2023 | Fong | |
| 2024/0038021 | A1 | 2/2024 | Higgins | |
| 2024/0062622 | A1 | 2/2024 | O'hara | |
| 2024/0062624 | A1 | 2/2024 | Patton | |
| 2025/0029447 | A1 | 1/2025 | McIntosh | |
| 2025/0029448 | A1 | 1/2025 | McIntosh | |
| 2025/0029449 | A1 | 1/2025 | McIntosh | |

OTHER PUBLICATIONS

Office Action (Final Rejection) dated Feb. 24, 2026 for U.S. Appl. No. 18/231,072 (pp. 1-20).

* cited by examiner

UNIFIED JACKPOT SYSTEM FOR PERSONALIZED JACKPOTS

TECHNICAL FIELD

The present disclosure concerns a unified jackpot system. In particular, a hosted gaming service may provide a unified jackpot system and Application Programming Interface (API) that is compatible and combinable with a variety of different gaming ecosystems, such as land-based gaming environments, online social or "free-to-play" gaming environments, or so-called online real-money "iGaming" environments. Specifically, the unified jackpot API may include a gaming device identifier (GID), a contributor identifier (CID), player ID, and/or a contributor type property to aid in the identifying and tracking of personalized jackpots awarded, e.g., to multiple players playing on multiple devices and in multiple games across land-based and/or online gaming environments.

BACKGROUND

Electronic gaming devices, such as electronic gaming machines (EGMs), computers, or other mobile devices, can provide a variety of wagering games, such as slot games, video poker games, video blackjack games, roulette games, video bingo games, keno games and other types of games that are frequently offered at casinos and other locations. Play on electronic gaming devices typically involves a player establishing a credit balance by inputting money, or another form of monetary credit and placing a monetary wager (from the credit balance) on one or more outcomes of an instance (or single play) of a primary or base game.

In some games, a jackpot award (e.g., a bonus or other form of progressive prize) may be awarded based on gameplay over time, e.g., based on wager activity within the game, overall game play time, or the like. In addition to jackpots with monetary value, other types of so-called "non-monetary value" bonus awards may also be included in EGM-based and/or mobile device-based gaming environments. For example, a jackpot award may have a present value that is unique and specific to the player, e.g., based on the player's historical activity within the game. As a player engages in free-to-play (e.g., social and, typically, online-based) gaming activity, real money wagering gaming activity, online gaming activity (with or without real money wagering), and/or land-based gaming activity (e.g., on a casino floor), there is currently no unified system that can satisfactorily track this various activity and jackpot awards (i.e., of monetary and/or non-monetary value) to one or more players over time.

Slot games and other wagering games may be developed by many different gaming studios, and such games may be targeted to be played in many different gaming environments and/or on different gaming platforms. Thus, it would be beneficial, from a game development and player loyalty standpoint, to provide a novel and flexible unified jackpot system, to support the simultaneous tracking and processing of personalized jackpot awards to multiple players and/or devices—in both the land-based and online gaming environments.

DETAILED DESCRIPTION

I. Introduction

I.A. Overview

Figure 1:
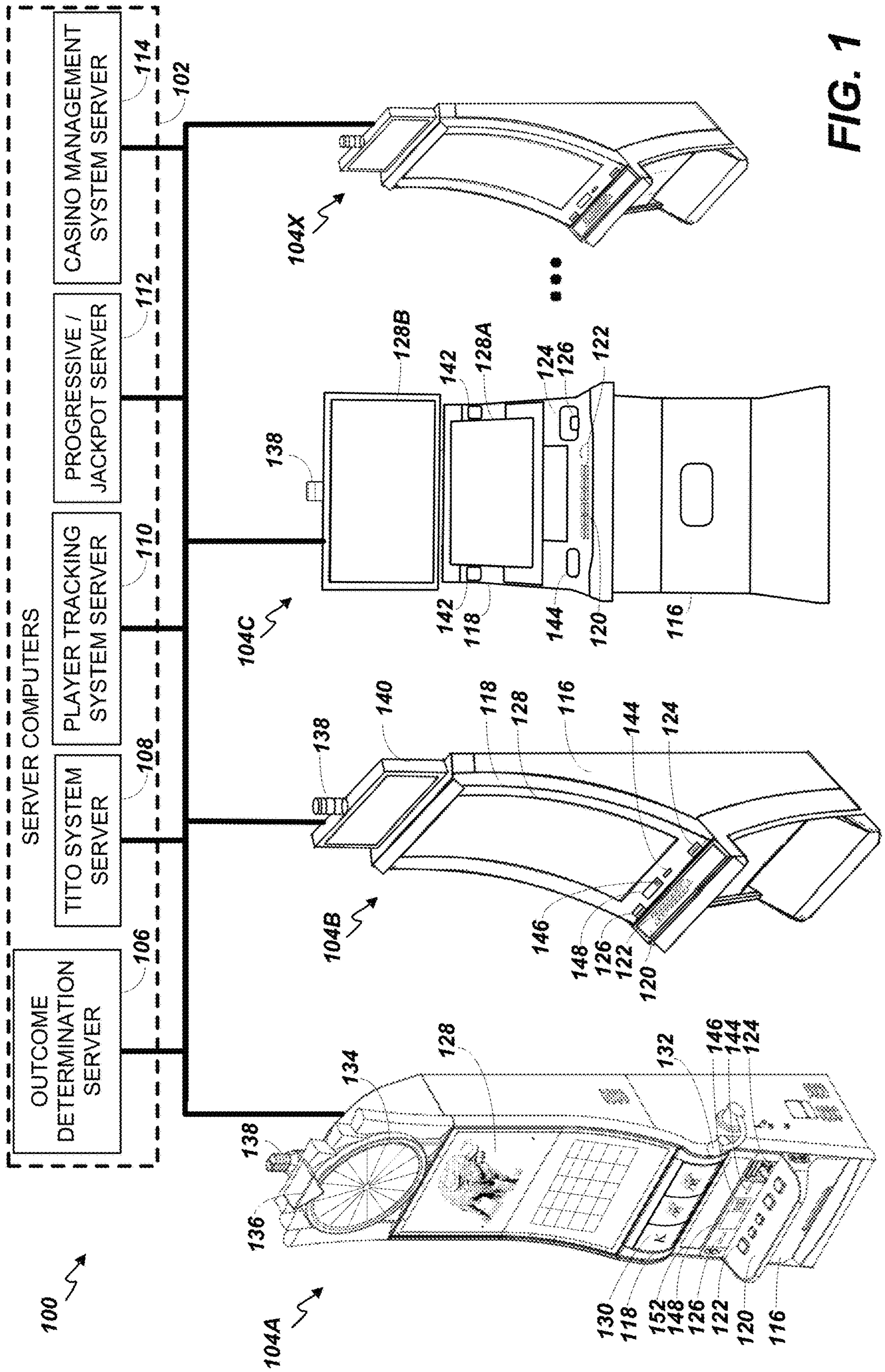
FIG. 1 is an exemplary diagram showing several EGMs networked with various gaming-related servers.

The disclosed technology is directed to embodiments of a unified jackpot system. A unified jackpot, as used herein, refers to a bonus or other form of jackpot prize that may be awarded in a gaming environment and whose value (e.g., monetary and/or non-monetary value) may or may not affect the Return to Player (RTP) percentages of the game in which the jackpot is awarded. Individual players may have one or more types or categories of jackpots, some of which may grow or increase over time (i.e., "progressive" jackpots), e.g., based on one or more of the following: player activity, amount of money wagered, and/or other randomly-determined events (e.g., "Fun Fridays," player birthdays, anniversaries, etc.) that may occur during a player's gameplay. In particular, a hosted gaming service may provide a unified jackpot system and API that is compatible and combinable with a variety of different gaming environments and able to track a player's play across such different gaming environments, such as land-based gaming environments, social gaming environments, and iGaming environments, as well as a variety of different gaming types, such as slots, keno, table games, sports betting, lotteries, etc. The unified jackpot systems described herein thus create a so-called "omnichannel jackpot" (also referred to herein as an "omnichannel jackpot link") that allows a player to seamlessly engage and/or transition game experiences between different gaming environments. In some cases, "omnichannel" gaming experiences may involve play that spans real money gaming (RMG) and free-to-play gaming environments at different times. In other cases, omnichannel gaming experiences may involve so-called "RMG convergence," i.e., gaming experiences or interactions for a player between brick-and-mortar casinos and iGaming casinos. In still other cases, omnichannel gaming experiences may involve so-called "social convergence," i.e., gaming experiences or interactions for a player between "free-to-play" casinos and iGaming casinos. It is also to be understood that the unified jackpot systems described herein are capable of linking player jackpot accounts across different particular games.

In some embodiments, the omnichannel unified jackpot API may include use of a gaming device identifier (GID) such as an EGM ID, a contributor identifier (CID), player ID, and/or a contributor type property to aid in the identifying and tracking of jackpots awarded, e.g., to multiple players playing on multiple devices and in multiple games across land-based and/or online gaming environments. The CID may comprise a universal identifier for the player (or player account) that is currently engaged in a gaming session that may award the player one or more jackpots. The CID could be based, e.g., on a combination of one or more of the following: a land-based player account ID (e.g., a casino loyalty program customer number), an online gaming account ID, a digital wallet account number, a gaming device ID (e.g., an EGM ID, a table game ID, a mobile gaming ID, or other betting terminal ID), a partner entity ID, or a merged account identifier. The contributor type property may be used to indicate what types of gaming platform (e.g., a land-based casino or an online game) and/or what type of contributor (i.e., a "personal" progressive jackpot) the current progressive jackpot contribution is being made from. In some implementations, a CID may be unique across all playing environments and historical data.

The unified jackpot systems described herein may be capable of managing numerous jackpot-awarding games at one time, wherein each jackpot that is being managed for a given player may be assigned a unique jackpot ID. A given contributor can contribute to many jackpots simultaneously, and the contributor ID can change based on the context of the jackpot. Each jackpot may also be associated with its own set of properties, such as incremental rate (static or dynamic incremental rates), jackpot award type, last jackpot award date, current jackpot award value, maximum jackpot award value, etc. With these identifiers and properties, the unified jackpot system can simultaneously track, monitor, and award multiple jackpot prizes to different types of gaming devices and players across different gaming ecosystems and/or different designated games.

Because of the flexibility and scalability of the omnichannel unified jackpot system designs described herein, the unified jackpot systems can monitor and track many types of jackpot award, e.g., progressive jackpots that increment based on something other than a player's wager (i.e., the so-called "coin-in" value) or bonus awards that are funded through so-called "marketing" dollars, i.e., money that is earmarked as a marketing expense and not directly tied to the outcomes of a player's gameplay activity. A free-to-play game (and/or a pay-to-play game) could be configured to award jackpots in various forms of online currency/rewards points for player to use only for online gaming purposes. In other words, such online currency/rewards points may not have a direct value exchange to real money (e.g., USD), and hence, such jackpot prizes would not be awarded in terms of real money. In some embodiments, play on land-based or RMG games could also lead to the award of jackpots usable in free-to-play games, if so desired, e.g., to drive players to try out new online or social games they may not have played before.

As may now be appreciated, the flexibility and scalability of the omnichannel unified jackpot system designs described herein also provide a framework to create a system that is able to combine different types of jackpot awards. In one implementation (also referred to herein as "RMG convergence"), for example, the system could combine and link all "real money" jackpot awards, e.g., whether earned in an online game or a land-based progressive game, together. In other words, the unified jackpot system could communicate with both the special jackpot controllers installed in land-based casinos, as well as online gaming servers, in order to increment and fund the same jackpot accounts for particular players. Jackpots could, therefore, be awarded based on both casino-based play and online or "iGaming" play. In some instances, a particular player could even be playing a game at a casino and simultaneously be logged in and playing an online version of the same game (or a different game) on a personal electronic device (e.g., a tablet or mobile phone), with each instance of the player's game play eligible to award a jackpot prize to the player (e.g., a same type of jackpot prize and/or multiple types of different jackpot prizes). Each casino and online player of a given game could have the same odds of being awarded a jackpot prize-even though the players may be from different gaming ecosystems.

Because of regulatory considerations, different jackpot award types may be separated logically and/or physically. As an example, jackpots that are awarded based on amounts that a player has wagered over time (and/or jackpots with monetary value) may be separately maintained from the jackpots that are awarded based on an amount that a player has played a free-to-play game (and/or jackpots generally that are non-monetary in nature).

In one or more implementations, the unified jackpot system links anonymous gaming activity, e.g., collected on the land-based side with a universal contributor identifier (CID) that is associated with one or more player-specific, i.e., personalized, jackpot accounts. As an example, the unified jackpot system may receive game play session data from a flexible data collection system installed in a land-based/casino environment, such as the system(s) described in U.S. patent application Ser. No. 17/858,769, filed on Jul. 6, 2022 and entitled "Data Collection Cloud System for Electronic Gaming Machines" ("the '769 application"), which is herein incorporated by reference in its entirety. The flexible data collection system is agnostic to the player tracking system and Casino Management System (CMS) used in a given casino. Specifically, the flexible data collection system can collect and send gaming data from one or more devices to an online environment (e.g., a cloud service) using the Game-to-System (G2S) protocol. The gaming data may initially be "player anonymous," i.e., not tied to a particular player account or player ID, and may subsequently be linked to a particular player's account, e.g., for jackpot tracking purposes. To link the player anonymous data, a player can use a digital wallet or a mobile app to scan a QR code to obtain EGM information. The player's mobile device can then pass the EGM identifier and universal contributor identifier to the unified jackpot system. The unified jackpot system links and combines the player anonymous data with the data received from the mobile device. Afterwards, the combined data with the universal contributor identifier information can be sent to a player jackpot reward engine for tracking and awarding jackpots. The unified progressive jackpot system may leverage an API that includes parameters, such as progressive/jackpot identifier (ID), universal contributor ID, player ID, and/or contributor type, which allow for accurate tracking and accounting of one or more player-specific jackpot accounts that are simultaneously active. The universal contributor ID would identify the player/player account that is currently contributing to the player jackpot account. The contributor ID could be an assigned universal identifier used across the different gaming environments or an identifier that is linked to a land-based player account, online gaming account, and/or digital wallet account. The contributor type parameter could represent the gaming platform (e.g., online or land-based casino) that the contribution is made from. With these parameters, the unified jackpot system can track, monitor, and award jackpot prizes to different types of gaming device across different gaming ecosystems and/or different designated games.

The innovations disclosed herein can be implemented as part of a method, e.g., involving an electronic gaming device (such as an EGM or mobile device) and/or an electronic gaming server or other computer server(s) configured to perform the method. The innovations may also be embodied on non-transitory computer-readable media storing computer-executable instructions for causing one or more processors in a computer system to perform the disclosed methods. The various innovations can be used in combination or separately. This high-level summary is provided to introduce a selection of concepts in a simplified form that are further described below. This summary is not intended to identify key features or essential features of the claimed subject matter, nor is it intended to be used to limit the scope of the claimed subject matter. The foregoing and other objects, features, and advantages of the invention will become more apparent from the following detailed description, which proceeds with reference to the accompanying figures and illustrates a number of examples. Examples may also be capable of other and different applications, and some details may be modified in various respects-all without departing from the spirit and scope of the disclosed innovations.

I.B. General Considerations

The detailed description presents innovations in electronic gaming machines ("EGMs") and other electronic gaming devices and computer-implemented systems. Various alternatives to the examples described herein are possible. For example, some of the methods described herein can be altered by changing the ordering of the method acts described, by splitting, repeating, or omitting certain method acts, etc. The various aspects of the disclosed technology can be used in combination or separately. Some of the innovations described herein address one or more of the problems noted in the background. Typically, a given technique/tool does not solve all such problems. It is to be understood that other examples may be utilized and that structural, logical, software, hardware, and electrical changes may be made without departing from the scope of the disclosure. The following description is, therefore, not to be taken in a limited sense. Rather, the scope of the present disclosure is defined by the appended claims.

The innovations described herein may, among other things, execute a hosted gaming service, wherein the hosted gaming service comprises: a unified jackpot application programming interface (API); and one or more storage repositories; receiving, at the hosted gaming service via the unified jackpot API, an indication of: (1) a first contributor playing at a gaming device, wherein the first contributor comprises a first universal contributor identifier (CID); and (2) a first jackpot award from the gaming device; determining, at the hosted gaming service, that the first jackpot award is for the first contributor playing at the gaming device and, in response to determining that the first jackpot award is for the first contributor playing at the gaming device: calculating an updated jackpot value for the first contributor based on the first jackpot award; and storing, in the one or more storage repositories, the updated jackpot value for the first contributor. Finally, the hosted gaming service may return an indication of the updated jackpot value to the first contributor via the gaming device.

In some embodiments, the first universal CID may comprise one or more of: a partner ID; game ID; player ID; or an electronic gaming machine (EGM) ID. In some such embodiments, the first universal CID may comprise a concatenation of two or more of: a partner ID; game ID; or a player ID. In some embodiments, the first contributor may also further comprise a contributor type property. In other embodiments, the indication of the first contributor playing at the gaming device further comprises an identifier of the gaming device.

In other embodiments, the indication of the first contributor playing at the gaming device is received, at the hosting gaming service, via a second gaming device. In some such embodiments, the gaming device comprises an electronic gaming machine (EGM), and wherein the second gaming device comprises a personal electronic device associated with the first contributor. In other such embodiments, the second electronic device obtains an indication of an identifier of the gaming device from the gaming device (e.g., via scanning a QR code off the gaming device, logging into a digital wallet app that receives a near-field communication or RFID broadcast of the gaming device's identifier, logging directly into an RMG or social gaming website, etc.).

In other embodiments, in response to receiving the indication of the first contributor playing at the gaming device, the operations that the hosted gaming service is configured to perform further comprise: transmitting, from the hosted gaming service to the gaming device, an indication that the first contributor is playing at the gaming device.

In still other embodiments, the first jackpot award comprises one or more of: an award having a monetary value based on game play by the first contributor; an award having a monetary value that is not based directly on game play by the first contributor; an award having a non-monetary value based on game play by the first contributor; or an award having a non-monetary value that is not based directly on game play by the first contributor. In some embodiments, at least a portion of the first jackpot award may be configured to expire after a predetermined or configurable interval of inactivity by the first contributor, e.g., expiring after an interval of time during which the contributor does not play a particular game(s).

In yet other embodiments, the hosted gaming service may further receiving, via the unified jackpot API, an indication of: the first contributor playing at a second gaming device, wherein the second gaming device comprises a personal electronic device; and a second jackpot award from the second gaming device; and determining, at the hosted gaming service, that the second jackpot award is for the first contributor playing at the second gaming device. Then, in response to determining that the second jackpot award is for the first contributor playing at the second gaming device, the hosted gaming service may: calculate an updated jackpot value for the first contributor based on the second jackpot award; and store, in the one or more storage repositories, the updated jackpot value for the first contributor. Finally, the hosted gaming service may return an indication of the updated jackpot value to the first contributor via the gaming device and/or the second gaming device (as well as to any other devices that may be relevant or related to the first contributor). As may be appreciated, the gaming device and second gaming in such a scenario may comprise the same types of devices or different types of devices. For example, in one scenario, the gaming device may comprise a land-based gaming machine, and the second gaming device may comprise a personal electronic device, such as an iGaming device, mobile phone, tablet, or the like. Moreover, the jackpot award earned in game that is played (or is only playable) on the gaming device may be applicable to a game that is played (or is only playable) on the second gaming device, or the jackpot award may be redeemable at other types of properties altogether (e.g., restaurants, casinos, or other places of business). In other words, a jackpot award does not need to be usable only in the game (or type of game) in which it was awarded.

II. Example Electronic Gaming Servers and Electronic Gaming Machines or Devices FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.), which server computers 102 can implement one or more aspects of the present disclosure. The gaming devices 104A-104X may alternatively be portable and/or remote gaming devices such as, but not limited to, a smart phone, a tablet, a laptop, or a game console. Gaming devices 104A-104X utilize specialized software and/or hardware to form non-generic, particular machines or apparatuses that comply with regulatory requirements regarding devices used for wagering or games of chance that provide monetary awards.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communication networks, such as over the Internet, through a website maintained by a computer on a remote server, or over an online data network, including commercial online service providers, Internet service providers, private networks (e.g., local area networks and enterprise networks), and the like (e.g., wide area networks). The communication networks could allow gaming devices 104A-104X to communicate with one another and/or the server computers 102 using a variety of communication-based technologies, such as radio frequency (RF) (e.g., wireless fidelity (WiFi®) and Bluetooth®), cable TV, satellite links and the like.

In some implementations, server computers 102 may not be necessary and/or preferred. For example, in one or more implementations, a stand-alone gaming device such as gaming device 104A, gaming device 104B or any of the other gaming devices 104C-104X can implement one or more aspects of the present disclosure while connected locally to a machine hosting the aforementioned gaming platform. In some such cases, the local machine(s) hosting the gaming platform may be within the gaming device 104. However, it is typical to find multiple electronic gaming devices connected to networks implemented with one or more of the different server computers 102 described herein.

II.A. Example Server Computers

The server computers 102 may include an outcome determination server 106, e.g., a central determination gaming system server, a multimedia content distribution server, or other type of backend server (examples of which will be discussed in greater detail below), a ticket-in-ticket-out (TITO) system server 108, a player tracking system server 110, a progressive/jackpot system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on an outcome determination server 106 and then transmitted over the network to any of a group of remote terminals or remote gaming devices 104A-104X that utilize the game outcomes and display the results to the players. Additional features of an improved progressive/jackpot system server 112, e.g., comprising a flexible progressive jackpot system and/or an omnichannel unified jackpot system, which may, e.g., be hosted in a cloud-based environment—rather than being located on-site at a land-based casino, as progressive/jackpot system server 112 shown in FIG. 1 is—will be described in further detail below, e.g., with reference to FIGS. 4-11.

II.B. Example Gaming Devices

Gaming device 104A is often of a cabinet construction which may be aligned in rows or banks of similar devices for placement and operation on a casino floor. The gaming device 104A often includes a main door which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat© Technologies, Inc. As shown, gaming device 104A is a reel machine having a gaming display area 118 comprising a number (typically 3 or 5) of mechanical reels 130 with various symbols displayed on them. The mechanical reels 130 are independently spun and stopped to show a set of symbols within the gaming display area 118 which may be used to determine an outcome to the game.

In many configurations, the gaming device 104A may have a main display 128 (e.g., video display monitor) mounted to, or above, the gaming display area 118. The main display 128 can be a high-resolution liquid crystal display (LCD), plasma, light emitting diode (LED), or organic light emitting diode (OLED) panel which may be flat or curved as shown, a cathode ray tube, or other conventional electronically controlled video monitor.

In some implementations, the bill validator 124 may also function as a "ticket-in" reader that allows the player to use a casino issued credit ticket to load credits onto the gaming device 104A (e.g., in a cashless ticket ("TITO") system). In such cashless implementations, the gaming device 104A may also include a "ticket-out" printer 126 for outputting a credit ticket when a "cash out" button is pressed. Cashless TITO systems are used to generate and track unique barcodes or other indicators printed on tickets to allow players to avoid the use of bills and coins by loading credits using a ticket reader and cashing out credits using a ticket-out printer 126 on the gaming device 104A. The gaming device 104A can have hardware meters for purposes including ensuring regulatory compliance and monitoring the player credit balance. In addition, there can be additional meters that record the total amount of money wagered on the gaming device, total amount of money deposited, total amount of money withdrawn, total amount of winnings on gaming device 104A.

In some implementations, a player tracking card reader 144, a transceiver for wireless communication with a mobile device (e.g., a player's smartphone), a keypad 146, and/or an illuminated display 148 for reading, receiving, entering, and/or displaying player tracking information is provided in gaming device 104A. In such implementations, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some implementations, the information panel(s) 152 may be implemented as an additional video display.

Gaming devices 104A have traditionally also included a handle 132 typically mounted to the side of main cabinet 116 which may be used to initiate game play.

Figure 2A:
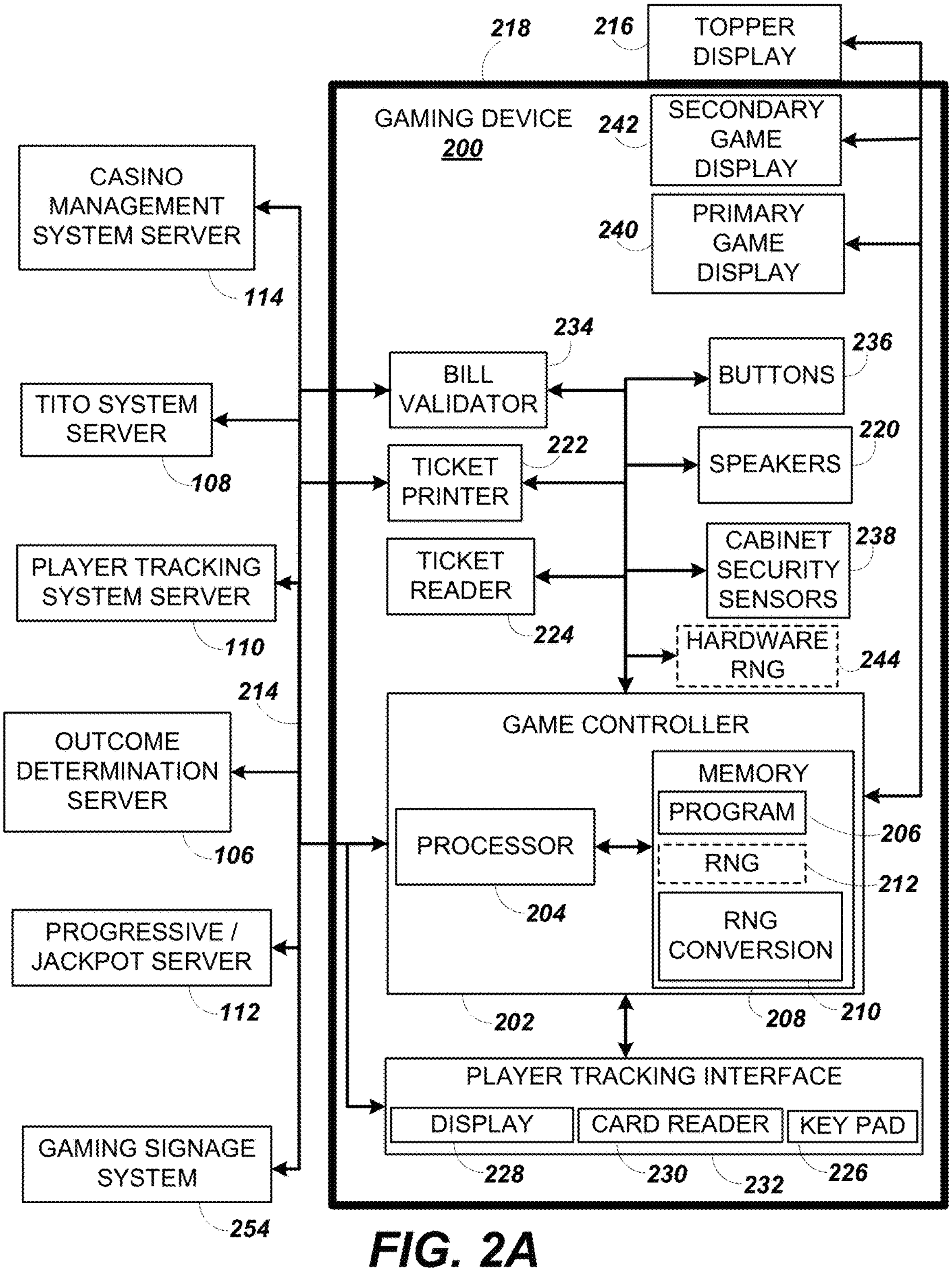
FIG. 2A is a block diagram showing various functional elements of an exemplary EGM.

Many or all the above-described components can be controlled by circuitry (e.g., a game controller) housed inside the main cabinet 116 of the gaming device 104A, the details of which are shown in FIG. 2A.

An alternative example gaming device 104B illustrated in FIG. 1 is the Arc™ model gaming device manufactured by Aristocrat© Technologies, Inc. Note that where possible, reference numerals identifying similar features of the gaming device 104A implementation are also identified in the gaming device 104B implementation using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some implementations, the optional topper screen 140 may also or alternatively be used to display progressive jackpot prizes available to a player during play of gaming device 104B.

Example gaming device 104B includes a main cabinet 116 including a main door which opens to provide access to the interior of the gaming device 104B. The main or service door is typically used by service personnel to refill the ticket-out printer 126 and collect bills and tickets inserted into the bill validator 124. The main or service door may also be accessed to reset the machine, verify and/or upgrade the software, and for general maintenance operations.

Another example gaming device 104C shown is the Helix™ model gaming device manufactured by Aristocrat© Technologies, Inc. Gaming device 104C includes a main display 128A that is in a landscape orientation. Although not illustrated by the front view provided, the main display 128A may have a curvature radius from top to bottom, or alternatively from side to side. In some implementations, main display 128A is a flat panel display. Main display 128A is typically used for primary game play while secondary display 128B is typically used for bonus game play, to show game features or attraction activities while the game is not in play or any other information or media desired by the game designer or operator. In some implementations, example gaming device 104C may also include speakers 142 to output various audio such as game sound, background music, etc.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

II.C. Example Components of Gaming Devices

FIG. 2A is a block diagram depicting exemplary internal electronic components of a gaming device 200 connected to various external systems. All or parts of the gaming device 200 shown could be used to implement any one of the example gaming devices 104A-X depicted in FIG. 1. As shown in FIG. 2A, gaming device 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. FIG. 2 also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2A illustrates that game controller 202 includes a single processor 204, game controller 202 is not limited to this representation and instead can include multiple processors 204 (e.g., two or more processors).

FIG. 2A illustrates that processor 204 is operatively coupled to memory 208. Memory 208 is defined herein as including volatile and nonvolatile memory and other types of non-transitory data storage components. Volatile memory is memory that do not retain data values upon loss of power. Nonvolatile memory is memory that do retain data upon a loss of power. Examples of memory 208 include random access memory (RAM), read-only memory (ROM), hard disk drives, solid-state drives, universal serial bus (USB) flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2A illustrates that game controller 202 includes a single memory 208, game controller 202 could include multiple memories 208 for storing program instructions and/or data.

Memory 208 can store one or more game programs 206 that provide program instructions and/or data for carrying out various implementations (e.g., game mechanics) described herein. Stated another way, game program 206 represents an executable program stored in any portion or component of memory 208. In one or more implementations, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be set up to generate one or more game instances based on instructions and/or data that gaming device 200 exchanges with one or more remote gaming devices, such as an outcome determination server 106 (also shown in FIG. 1). For purpose of this disclosure, the term "game instance" refers to a play or a round of a game that gaming device 200 presents (e.g., via a user interface (UI)) to a player. The game instance is communicated to gaming device 200 via the network 214 and then displayed on gaming device 200. For example, gaming device 200 may execute game program 206 as video streaming software that allows the game to be displayed on gaming device 200.

In some embodiments, the outcome determination server 106 may comprise a multi-threaded architecture, allowing multiple connections and/or game instances to utilize the outcome determination server 106. In some implementations, e.g., wherein the outcome determination server 106 is hosted at a cloud service provider, the amount of resources at the cloud service provider that are dedicated to a particular game (e.g., number of servers, number of threads, amount of memory, bandwidth, etc.) may be scaled dynamically to accommodate the real-time needs of the hosted game. When a game is stored on gaming device 200, it may be loaded from memory 208 (e.g., from a read only memory (ROM)) or from the outcome determination server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2A illustrates that gaming device 200 could include an RNG 212 that utilizes hardware and/or software to generate RNG outcomes that lack any pattern. The RNG operations are often specialized and non-generic in order to comply with regulatory and gaming requirements. For example, in a slot game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating Bingo cards. In one or more implementations, RNG 212 could be one of a set of RNGs operating on gaming device 200. More generally, an output of the RNG 212 can be the basis on which game outcomes are determined by the game controller 202. Game developers could vary the degree of true randomness for each RNG (e.g., pseudorandom) and utilize specific RNGs depending on game requirements. The output of the RNG 212 can include a random number or pseudorandom number (either is generally referred to as a "random number").

In FIG. 2A, RNG 212 and hardware RNG 244 are shown in dashed lines to illustrate that RNG 212, hardware RNG 244, or both can be included in gaming device 200. In one implementation, instead of including RNG 212, gaming device 200 could include a hardware RNG 244 that generates RNG outcomes. Analogous to RNG 212, hardware RNG 244 performs specialized and non-generic operations in order to comply with regulatory and gaming requirements. For example, because of regulation requirements, hardware RNG 244 could be a random number generator that securely produces random numbers for cryptography use. The gaming device 200 then uses the secure random numbers to generate game outcomes for one or more game features. In another implementation, the gaming device 200 could include both hardware RNG 244 and RNG 212. RNG 212 may utilize the RNG outcomes from hardware RNG 244 as one of many sources of entropy for generating secure random numbers for the game features. It is to be understood that, in certain embodiments, one or more of the functions described above as being performed by game controller 202 (e.g., the RNG functionality, game program storage and/or execution, etc.) may also be performed in whole, or in part, by a hosted server platform, such as outcome determination server 106 or other servers. As will be explained in more detail below, in some embodiments, a client/server architecture may be employed with a game front end application passing requests and other information to a game backend layer, via an application service layer.

Another regulatory requirement for running games on gaming device 200 includes ensuring a certain level of RTP. Similar to the randomness requirement discussed above, numerous gaming jurisdictions also mandate that gaming device 200 provides a minimum level of RTP (e.g., RTP of at least 75%). A game can use one or more lookup tables (also called weighted tables) as part of a technical solution that satisfies regulatory requirements for randomness and RTP. In particular, a lookup table can integrate game features (e.g., trigger events for special modes or bonus games; newly introduced game elements such as extra reels, new symbols, or new cards; stop positions for dynamic game elements such as spinning reels, spinning wheels, or shifting reels; or card selections from a deck) with random numbers generated by one or more RNGs, so as to achieve a given level of volatility for a target level of RTP. (In general, volatility refers to the frequency or probability of an event such as a special mode, payout, etc. For example, for a target level of RTP, a higher-volatility game may have a lower payout most of the time with an occasional bonus having a very high payout, while a lower-volatility game has a steadier payout with more frequent bonuses of smaller amounts.) Configuring a lookup table can involve engineering decisions with respect to how RNG outcomes are mapped to game outcomes for a given game feature, while still satisfying regulatory requirements for RTP. Configuring a lookup table can also involve engineering decisions about whether different game features are combined in a given entry of the lookup table or split between different entries (for the respective game features), while still satisfying regulatory requirements for RTP and allowing for varying levels of game volatility.

FIG. 2A illustrates that gaming device 200 includes an RNG conversion engine 210 that translates the RNG outcome from RNG 212 to a game outcome presented to a player. To meet a designated RTP, a game developer can set up the RNG conversion engine 210 to utilize one or more lookup tables to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

FIG. 2A also depicts that gaming device 200 is connected over network 214 to player tracking system server 110. Player tracking system server 110 may be, for example, an OASIS© system manufactured by Aristocrat© Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 to establish a credit balance on the gaming device. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views with one or more UIs, the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Additionally, or alternatively, gaming devices 104A-104X and 200 can include or be coupled to one or more wireless transmitters, receivers, and/or transceivers (not shown in FIGS. 1 and 2A) that communicate (e.g., Bluetooth® or other near-field communication technology) with one or more mobile devices to perform a variety of wireless operations in a casino environment. Examples of wireless operations in a casino environment include detecting the presence of mobile devices, performing credit, points, comps, or other marketing or hard currency transfers, establishing wagering sessions, and/or providing a personalized casino-based experience using a mobile application. In one implementation, to perform these wireless operations, a wireless transmitter or transceiver initiates a secure wireless connection between a gaming device 104A-104X and 200 and a mobile device. After establishing a secure wireless connection between the gaming device 104A-104X and 200 and the mobile device, the wireless transmitter or transceiver does not send and/or receive application data to and/or from the mobile device. Rather, the mobile device communicates with gaming devices 104A-104X and 200 using another wireless connection (e.g., WiFi® or cellular network). In another implementation, a wireless transceiver establishes a secure connection to directly communicate with the mobile device. The mobile device and gaming device 104A-104X and 200 sends and receives data utilizing the wireless transceiver instead of utilizing an external network. For example, the mobile device would perform digital wallet transactions by directly communicating with the wireless transceiver. In one or more implementations, a wireless transmitter could broadcast data received by one or more mobile devices without establishing a pairing connection with the mobile devices.

Although FIGS. 1 and 2A illustrate specific implementations of a gaming device (e.g., gaming devices 104A-104X and 200), the disclosure is not limited to those implementations shown in FIGS. 1 and 2. For example, not all gaming devices suitable for implementing implementations of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or tabletops and have displays that face upwards. Gaming devices 104A-104X and 200 may also include other processors that are not separately shown. Using FIG. 2A as an example, gaming device 200 could include display controllers (not shown in FIG. 2A) configured to receive video input signals or instructions to display images on game displays 240 and 242. Alternatively, such display controllers may be integrated into the game controller 202. The use and discussion of FIGS. 1 and 2 are examples to facilitate ease of description and explanation.

II.D. Example Gaming Environment

Figure 2B:
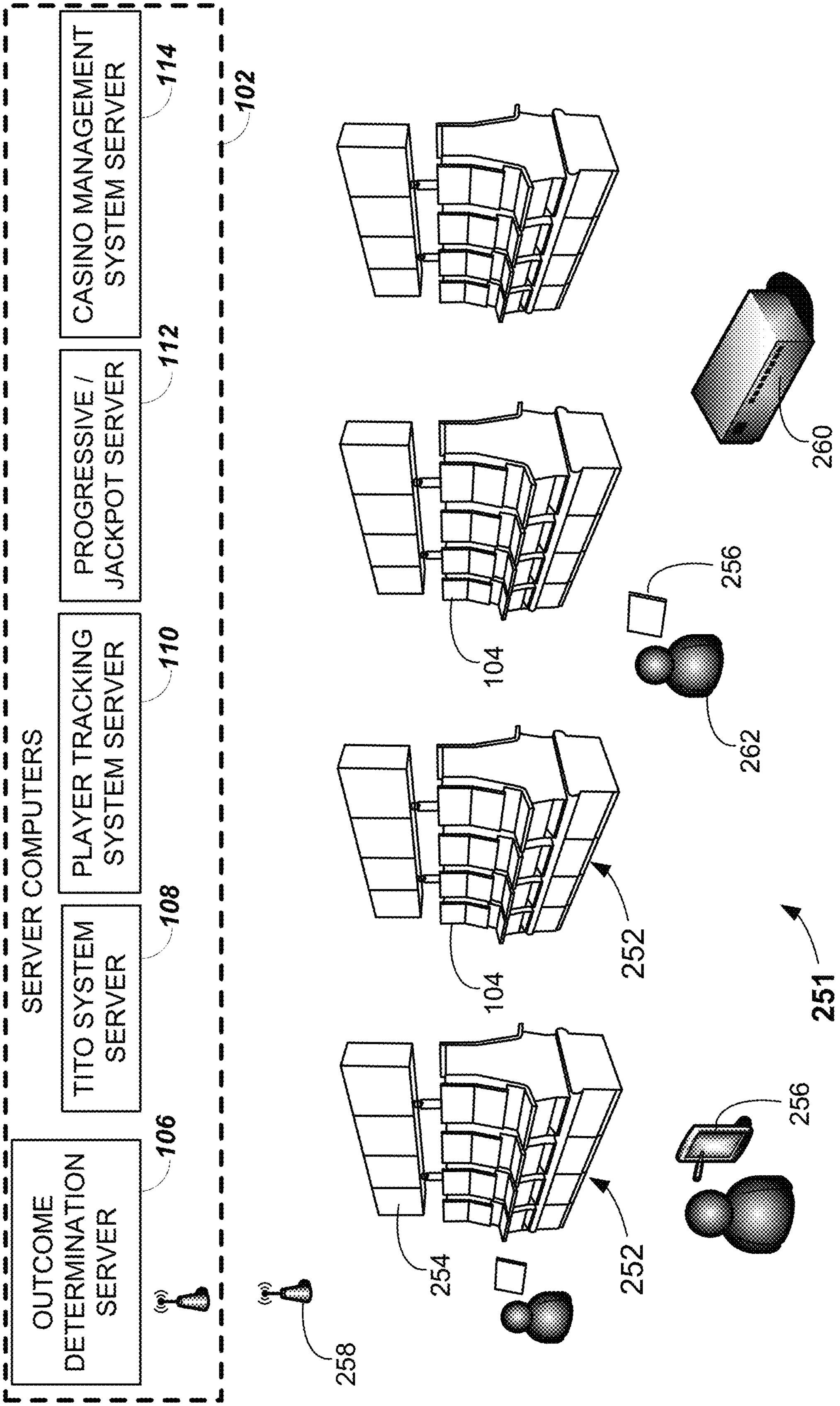
FIG. 2B depicts a casino gaming environment according to one example.

FIG. 2B depicts a casino gaming environment according to one example. In this example, the casino 251 includes banks 252 of EGMs 104. In this example, each bank 252 of EGMs 104 includes a corresponding gaming signage system 254 (also shown in FIG. 2A). According to this implementation, the casino 251 also includes mobile gaming devices 256, which are also configured to present wagering games in this example. The mobile gaming devices 256 may, for example, include tablet devices, cellular phones, smart phones and/or other handheld devices. In this example, the mobile gaming devices 256 are configured for communication with one or more other devices in the casino 251, including but not limited to one or more of the server computers 102, via wireless access points 258. In other examples, the mobile gaming devices 256 may also be configured for communication with one or more other devices external to the casino 251, e.g., players located elsewhere in a particular city, elsewhere in a particular state, at a particular casino's other locations, and so forth.

According to some examples, the mobile gaming devices 256 may be configured for stand-alone determination of game outcomes. However, in some alternative implementations the mobile gaming devices 256 may be configured to receive game outcomes from another device, such as the outcome determination server 106, progressive/jackpot system server 112, one of the EGMs 104, etc.

Some mobile gaming devices 256 may be configured to accept monetary credits from a credit or debit card, via a wireless interface (e.g., via a wireless payment app), via tickets, via a patron casino account, etc. However, some mobile gaming devices 256 may not be configured to accept monetary credits via a credit or debit card. Some mobile gaming devices 256 may include a ticket reader and/or a ticket printer whereas some mobile gaming devices 256 may not, depending on the particular implementation.

In some implementations, the casino 251 may include one or more kiosks 260 that are configured to facilitate monetary transactions involving the mobile gaming devices 256, which may include cash out and/or cash in transactions. The kiosks 260 may be configured for wired and/or wireless communication with the mobile gaming devices 256. The kiosks 260 may be configured to accept monetary credits from casino patrons 262 and/or to dispense monetary credits to casino patrons 262 via cash, a credit or debit card, via a wireless interface (e.g., via a wireless payment app), via tickets, etc. According to some examples, the kiosks 260 may be configured to accept monetary credits from a casino patron and to provide a corresponding amount of monetary credits to a mobile gaming device 256 for wagering purposes, e.g., via a wireless link such as a near-field communications link. In some such examples, when a casino patron 262 is ready to cash out, the casino patron 262 may select a cash out option provided by a mobile gaming device 256, which may include a real button or a virtual button (e.g., a button provided via a graphical user interface) in some instances. In some such examples, the mobile gaming device 256 may send a "cash out" signal to a kiosk 260 via a wireless link in response to receiving a "cash out" indication from a casino patron. The kiosk 260 may provide monetary credits to the casino patron 262 corresponding to the "cash out" signal, which may be in the form of cash, a credit ticket, a credit transmitted to a financial account corresponding to the casino patron, etc.

In some implementations, a cash-in process and/or a cash-out process may be facilitated by the TITO system server 108. For example, the TITO system server 108 may control, or at least authorize, ticket-in and ticket-out transactions that involve a mobile gaming device 256 and/or a kiosk 260.

Some mobile gaming devices 256 may be configured for receiving and/or transmitting player loyalty information. For example, some mobile gaming devices 256 may be configured for wireless communication with the player tracking system server 110. Some mobile gaming devices 256 may be configured for receiving and/or transmitting player loyalty information via wireless communication with a patron's player loyalty card, a patron's smartphone, etc.

According to some implementations, a mobile gaming device 256 may be configured to provide safeguards that prevent the mobile gaming device 256 from being used by an unauthorized person. For example, some mobile gaming devices 256 may include one or more biometric sensors and may be configured to receive input via the biometric sensor(s) to verify the identity of an authorized patron. Some mobile gaming devices 256 may be configured to function only within a predetermined or configurable area, such as a casino gaming area.

II.E. Example Distributed Gaming Delivery

Figure 2C:
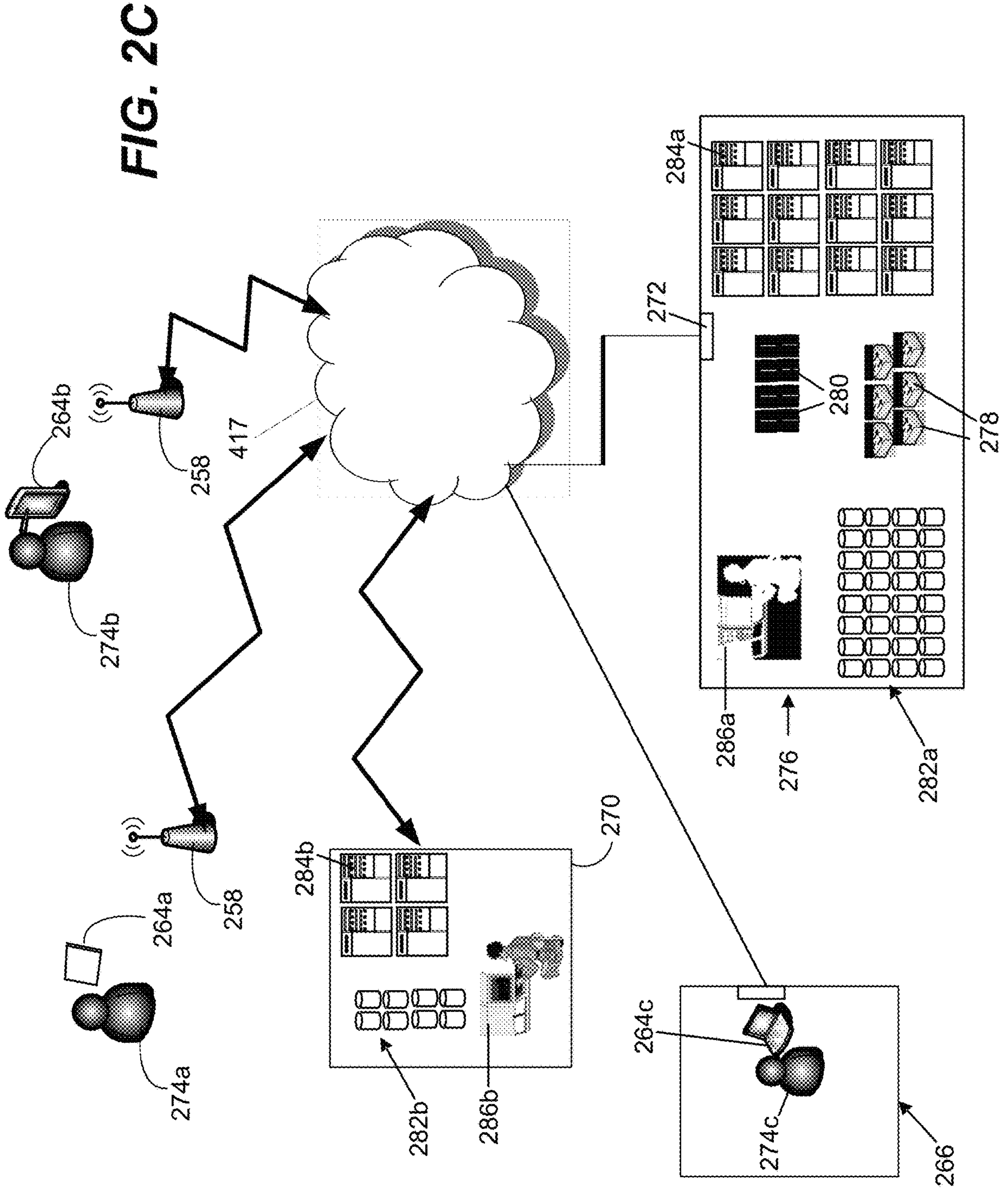
FIG. 2C is a diagram that shows examples of components of a system for providing online gaming according to some aspects of the present disclosure.

FIG. 2C is a diagram that shows examples of components of a system for providing online gaming according to some aspects of the present disclosure. As with other figures presented in this disclosure, the numbers, types and arrangements of gaming devices shown in FIG. 2C are merely shown by way of example. In this example, various gaming devices, including but not limited to end user devices (EUDs) 264*a*, 264*b* and 264*c* are capable of communication via one or more networks 417. The networks 417 may, for example, include one or more cellular telephone networks, the Internet, etc. In this example, the EUDs 264*a* and 264*b* are mobile devices: according to this example the EUD 264*a* is a tablet device and the EUD 264*b* is a smart phone. In this implementation, the EUD 264*c* is a laptop computer that is located within a residence 266 at the time depicted in FIG. 2C. Accordingly, in this example the hardware of EUDs is not specifically configured for online gaming, although each EUD is configured with software for online gaming. For example, each EUD may be configured with a web browser. Other implementations may include other types of EUD, some of which may be specifically configured for online gaming.

In this example, a gaming data center 276 includes various devices that are configured to provide online wagering games via the networks 417. The gaming data center 276 is capable of communication with the networks 417 via the gateway 272, including and one or more workstations 286*a*. In this example, switches 278 and routers 280 are configured to provide network connectivity for devices of the gaming data center 276, including storage devices 282*a*, servers 284*a* and one or more workstations 570*a*. The servers 284*a* may, for example, be configured to provide access to a library of games for online game play. In some examples, code for executing at least some of the games may initially be stored on one or more of the storage devices 282*a*. The code may be subsequently loaded onto a server 284*a* after selection by a player via an EUD and communication of that selection from the EUD via the networks 417. The server 284*a* onto which code for the selected game has been loaded may provide the game according to selections made by a player and indicated via the player's EUD. In other examples, code for executing at least some of the games may initially be stored on one or more of the servers 284*a*. Although only one gaming data center 276 is shown in FIG. 2C, some implementations may include multiple gaming data centers 276.

In this example, a financial institution data center 270 is also configured for communication via the networks 417. Here, the financial institution data center 270 includes servers 284*b*, storage devices 282*b*, and one or more workstations 286*b*. According to this example, the financial institution data center 270 is configured to maintain financial accounts, such as checking accounts, savings accounts, loan accounts, etc. In some implementations one or more of the authorized users 274*a*-274*c* may maintain at least one financial account with the financial institution that is serviced via the financial institution data center 270.

According to some implementations, the gaming data center 276 may be configured to provide online wagering games in which money may be won or lost. According to some such implementations, one or more of the servers 284*a* may be configured to monitor player credit balances, which may be expressed in game credits, in currency units, or in any other appropriate manner. In some implementations, the server(s) 284*a* may be configured to obtain financial credits from and/or provide financial credits to one or more financial institutions, according to a player's "cash in" selections, wagering game results and a player's "cash out" instructions. According to some such implementations, the server(s) 284*a* may be configured to electronically credit or debit the account of a player that is maintained by a financial institution, e.g., an account that is maintained via the financial institution data center 270. The server(s) 284*a* may, in some examples, be configured to maintain an audit record of such transactions.

In some alternative implementations, the gaming data center 276 may be configured to provide online wagering games for which credits may not be exchanged for cash or the equivalent. In some such examples, players may purchase game credits for online game play, but may not "cash out" for monetary credit after a gaming session. Moreover, although the financial institution data center 270 and the gaming data center 276 include their own servers and storage devices in this example, in some examples the financial institution data center 270 and/or the gaming data center 276 may use offsite "cloud-based" servers and/or storage devices. In some alternative examples, the financial institution data center 270 and/or the gaming data center 276 may rely entirely on cloud-based servers. In still other examples, as will be explained in further detail below, one or more third party cloud-based service providers may be utilized by a given casino, a given game developer, or given game studio to host backend game functionality for a number of different games (and/or a number of different players) simultaneously, according to a general service architecture and flexible backend platform design implementing a novel GDK to enhance and componentize game development.

One or more types of devices in the gaming data center 276 (or elsewhere) may be capable of executing middleware, e.g., for data management and/or device communication. Authentication information, player tracking information, etc., including but not limited to information obtained by EUDs 264 and/or other information regarding authorized users of EUDs 264 (including but not limited to the authorized users 274*a*-274*c*), may be stored on storage devices 282 and/or servers 284. Other game-related information and/or software, such as information and/or software relating to leaderboards, players currently playing a game, game themes, game-related promotions, game competitions, etc., also may be stored on storage devices 282 and/or servers 284. In some implementations, some such game-related software may be available as "apps" and may be downloadable (e.g., from the gaming data center 276) by authorized users.

In some examples, authorized users and/or entities (such as representatives of gaming regulatory authorities) may obtain gaming-related information via the gaming data center 276. One or more other devices (such EUDs 264 or devices of the gaming data center 276) may act as intermediaries for such data feeds. Such devices may, for example, be capable of applying data filtering algorithms, executing data summary and/or analysis software, etc. In some implementations, data filtering, summary and/or analysis software may be available as "apps" and downloadable by authorized users.

II.F. Example Game Processing Architecture

Figure 3:
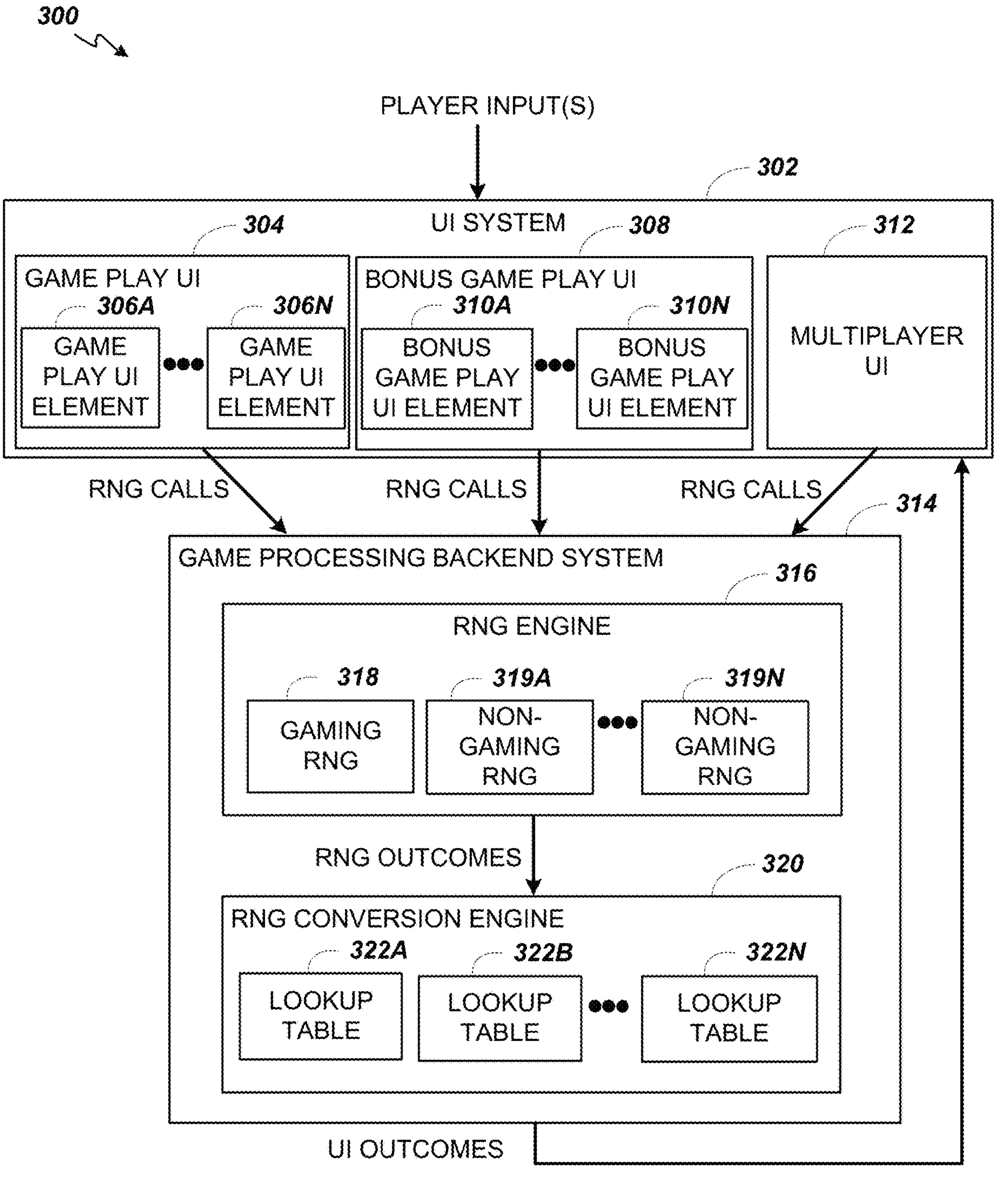
FIG. 3 illustrates, in block diagram form, an implementation of a game processing architecture algorithm that implements a game processing pipeline for the play of a game, in accordance with various implementations described herein.

FIG. 3 illustrates, in block diagram form, an implementation of a traditional, i.e., non-hosted, game processing architecture 300 that implements a game processing pipeline for the play of a game in accordance with various implementations described herein. As shown in FIG. 3, the gaming processing pipeline starts with having a UI system 302 receive one or more player inputs for the game instance. Based on the player input(s), the UI system 302 generates and sends one or more RNG calls to a game processing backend system 314. Game processing backend system 314 then processes the RNG calls with RNG engine 316 to generate one or more RNG outcomes. The RNG outcomes are then sent to the RNG conversion engine 320 to generate one or more game outcomes for the UI system 302 to display to a player. The game processing architecture 300 can implement the game processing pipeline using a gaming device, such as gaming devices 104A-104X and 200 shown in FIGS. 1 and 2, respectively. Alternatively, as will be discussed in further detail below, portions of the gaming processing architecture 300 can implement the game processing pipeline using a gaming device and one or more remote gaming devices, such as outcome determination server 106 shown in FIG. 1. In such implementations, the game processing pipeline may also utilize one or more game service clients, e.g., to pass inputs and requests between the gaming device/gaming application and the backend gaming system server that is hosting aspects of the game's functionality.

The UI system 302 includes one or more UIs that a player can interact with. The UI system 302 could include one or more game play UIs 304, one or more bonus game play UIs 308, and one or more multiplayer UIs 312, where each UI type includes one or more mechanical UIs and/or graphical UIs (GUIs). In other words, game play UI 304, bonus game play UI 308, and the multiplayer UI 312 may utilize a variety of UI elements, such as mechanical UI elements (e.g., physical "spin" button or mechanical reels) and/or GUI elements (e.g., virtual reels shown on a video display or a virtual button deck) to receive player inputs and/or present game play to a player. Using FIG. 3 as an example, the different UI elements are shown as game play UI elements 306A-306N and bonus game play UI elements 310A-310N.

The game play UI 304 represents a UI that a player typically interfaces with for a base game. During a game instance of a base game, the game play UI elements 306A-306N (e.g., GUI elements depicting one or more virtual reels) are shown and/or made available to a user. In a subsequent game instance, the UI system 302 could transition out of the base game to one or more bonus games. The bonus game play UI 308 represents a UI that utilizes bonus game play UI elements 310A-310N for a player to interact with and/or view during a bonus game. In one or more implementations, at least some of the game play UI element 306A-306N are similar to the bonus game play UI elements 310A-310N. In other implementations, the game play UI element 306A-306N can differ from the bonus game play UI elements 310A-310N.

FIG. 3 also illustrates that UI system 302 could include a multiplayer UI 312 purposed for game play that differs or is separate from the typical base game. For example, multiplayer UI 312 could be set up to receive player inputs and/or presents game play information relating to a tournament mode. When a gaming device transitions from a primary game mode that presents the base game to a tournament mode, a single gaming device is linked and synchronized to other gaming devices to generate a tournament outcome. For example, multiple RNG engines 316 corresponding to each gaming device could be collectively linked to determine a tournament outcome. To enhance a player's gaming experience, tournament mode can modify and synchronize sound, music, reel spin speed, and/or other operations of the gaming devices according to the tournament game play. After tournament game play ends, operators can switch back the gaming device from tournament mode to a primary game mode to present the base game. Although FIG. 3 does not explicitly depict that multiplayer UI 312 includes UI elements, multiplayer UI 312 could also include one or more multiplayer UI elements.

Based on the player inputs, the UI system 302 could generate RNG calls to a game processing backend system 314. As an example, the UI system 302 could use one or more application programming interfaces (APIs) to generate the RNG calls. To process the RNG calls, the RNG engine 316 could utilize gaming RNG 318 and/or non-gaming RNGs 319A-319N. Gaming RNG 318 could corresponds to RNG 212 or hardware RNG 244 shown in FIG. 2A. As previously discussed with reference to FIG. 2A, gaming RNG 318 often performs specialized and non-generic operations that comply with regulatory and/or game requirements. For example, because of regulation requirements, gaming RNG 318 could correspond to RNG 212 by being a cryptographic RNG or pseudorandom number generator (PRNG) (e.g., Fortuna PRNG) that securely produces random numbers for one or more game features. To securely generate random numbers, gaming RNG 318 could collect random data from various sources of entropy, such as from an operating system (OS) and/or a hardware RNG (e.g., hardware RNG 244 shown in FIG. 2A). Alternatively, non-gaming RNGs 319A-319N may not be cryptographically secure and/or be computationally less expensive. Non-gaming RNGs 319A-319N can, thus, be used to generate outcomes for non-gaming purposes. As an example, non-gaming RNGs 319A-319N can generate random numbers for generating random messages that appear on the gaming device.

The RNG conversion engine 320 processes each RNG outcome from RNG engine 316 and converts the RNG outcome to a UI outcome that is feedback to the UI system 302. With reference to FIG. 2A, RNG conversion engine 320 corresponds to RNG conversion engine 210 used for game play. As previously described, RNG conversion engine 320 translates the RNG outcome from the RNG 212 to a game outcome presented to a player. RNG conversion engine 320 utilizes one or more lookup tables 322A-322N to regulate a prize payout amount for each RNG outcome and how often the gaming device pays out the derived prize payout amounts. In one example, the RNG conversion engine 320 could utilize one lookup table to map the RNG outcome to a game outcome displayed to a player and a second lookup table as a pay table for determining the prize payout amount for each game outcome. In this example, the mapping between the RNG outcome and the game outcome controls the frequency in hitting certain prize payout amounts. Different lookup tables could be utilized depending on the different game modes, for example, a base game versus a bonus game.

After generating the UI outcome, the game processing backend system 314 sends the UI outcome to the UI system 302. (As mentioned above, in embodiments wherein aspects of the game's functionality are hosted by a backend server, the UI outcomes may be determined by the hosted game backend and then returned to the game via an application service layer so that the game application may update the appropriate audio and/or visual gameplay elements.) Examples of UI outcomes are symbols to display on a video reel or reel stops for a mechanical reel. In one example, if the UI outcome is for a base game, the UI system 302 updates one or more game play UI elements 306A-306N, such as symbols, for the game play UI 304. In another example, if the UI outcome is for a bonus game, the UI system could update one or more bonus game play UI elements 310A-310N (e.g., symbols) for the bonus game play UI 308. In yet another example, the UI outcome may reflect updating a visual display element (e.g., a virtual meter) with an updated progressive jackpot value. In response to updating the appropriate UI, the player may subsequently provide additional player inputs to initiate a subsequent game instance that progresses through the game processing pipeline. As will be explained herein, some games may also award so-called "bonus" jackpot awards that are outside of the typical gameplay loop and consideration of game RTP/regulatory requirements, as discussed above with reference to bonus game play UI 308. In fact, such bonus jackpot awards may often be non-monetary in nature, but may hold other value for a player, e.g., allowing the player to play other games in an online, free-to-play, or "iGaming" environment, redeem credits for other real-world prizes, new avatars, new avatar accessories, etc.

III. Example Embodiments

III.A. Technical Problems Associated with Hosted Gaming Services Having Progressive Jackpot Systems and/or Unified Jackpot Systems and Corresponding Application Programming Interfaces (APIs)

One technical problem that may be overcome via the various embodiments and solutions described herein involves implementing a dynamic progressive jackpot in an online, real money gaming environment that still satisfies stringent gaming regulations. Today's online progressive jackpots are typically static and do not increment in value as players play a designated online game. However, land-based games, e.g., electronic gaming machines on casino floors, often include wide area progressive (WAP) or multisite progressive (MSP) jackpots that increment as one or more players play one or more designated games. Generally, as players play the designated games, a portion of each player's wager (e.g., coin-in value) contributes to the WAP/MSP progressive jackpot—thereby incrementing the value of the progressive jackpot prize.

However, in the land-based/casino environment, casinos typically install specialized jackpot controller hardware to accurately track, monitor, and award a progressive jackpot prize in a closed-loop network. Such hardware jackpot controllers are typically specially configured to perform functionality often required by stringent gaming regulations. As an example, jackpot progressive values must be accurate and need to be subject to a high degree of auditability. Specifically, each contributor to a progressive must have an accurate progressive money wagered meter that can be reconciled for each jackpot trigger/hit. In the online, real money gaming environment, installing a specialized hardware jackpot controller or maintaining a closed loop network on each end user's device is not practical, and, thus, further technical improvements are needed to implement a dynamic and flexible progressive jackpot system in the online, real money gaming environment that would still be able to satisfy stringent gaming regulations—and potentially link with the values of corresponding progressive jackpots in the land-based/casino environment.

Another technical problem that may be overcome via the various embodiments and solutions described herein originates from how to implement a unified jackpot system that can account for both land-based and online gaming activity while remaining CMS-agnostic. Today's land-based/casino environment can track game activity data through a player tracking system. The player tracking system may be a closed network environment that may be unable to communicate directly with other online gaming environments. As a result, the player data stored and managed in a player tracking system may need an integration layer to share data with a given online gaming environment. The land-based/casino environment may also include a CMS-agnostic network used to track wide area progressive jackpots. Such closed networks typically include specialized jackpot controller hardware to accurately track, monitor, and award progressive jackpot prizes and other bonuses. Unfortunately, such networks often lack the capability to collect a wide variety of data, such as configuration and event tracking from EGMs on a casino floor. Moreover, such progressive networks also suffer from the problem of being unable to interface or communicate directly with the online gaming environment.

Further technical improvements are needed to implement an omnichannel jackpot-awarding system that links the play of particular players on particular gaming devices in the land-based/casino environment to their play in the online, real money gaming environment—and that can potentially incentivize play across different gaming environments, i.e., based on the awarding of particular types of jackpots to particular players.

Another technical problem that is important to understand when deploying the hosted progressive jackpot and/or unified jackpot system architectures described herein is to ensure that the proper type and numbers of data stores are selected. For example, if the deployment plan requires multiple, separate databases to be installed (e.g., for jurisdictional reasons), then additional configuration of the progressive jackpot and/or unified jackpot systems may be needed, e.g., in order to reconcile wide area progressive jackpots accurately or comply with local regulations. As another example, if the deployment must support cloud-based systems, as well as on-premises systems, then the selection of database platforms for the deployment would need to reflect that hybrid storage configuration.

III.B. Exemplary Hosted Progressive Jackpot System

Figure 4:
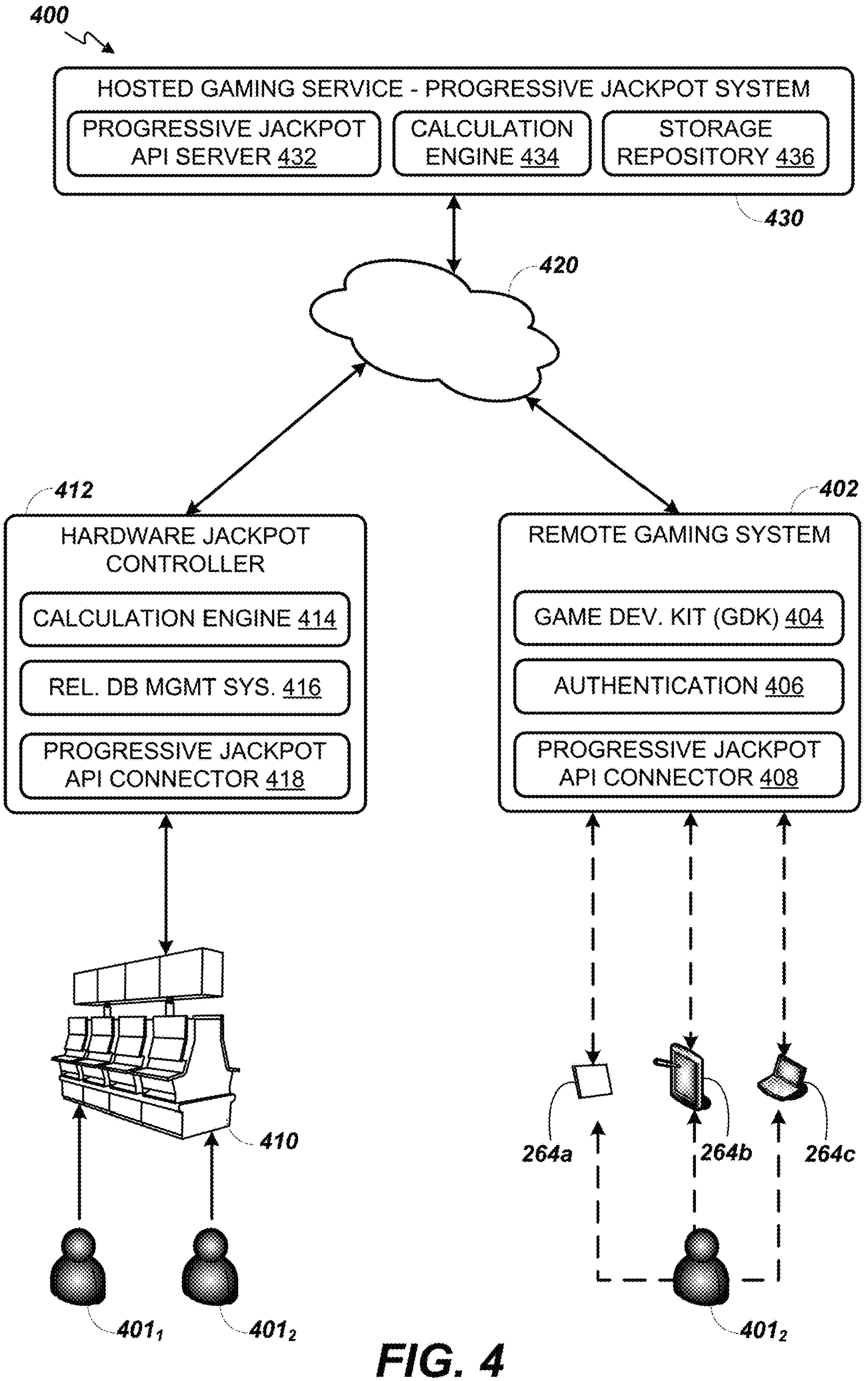
FIG. 4 illustrates, in block diagram form, an implementation of a hosted gaming service comprising a progressive jackpot system, in accordance with various implementations described herein.
Figure 5:
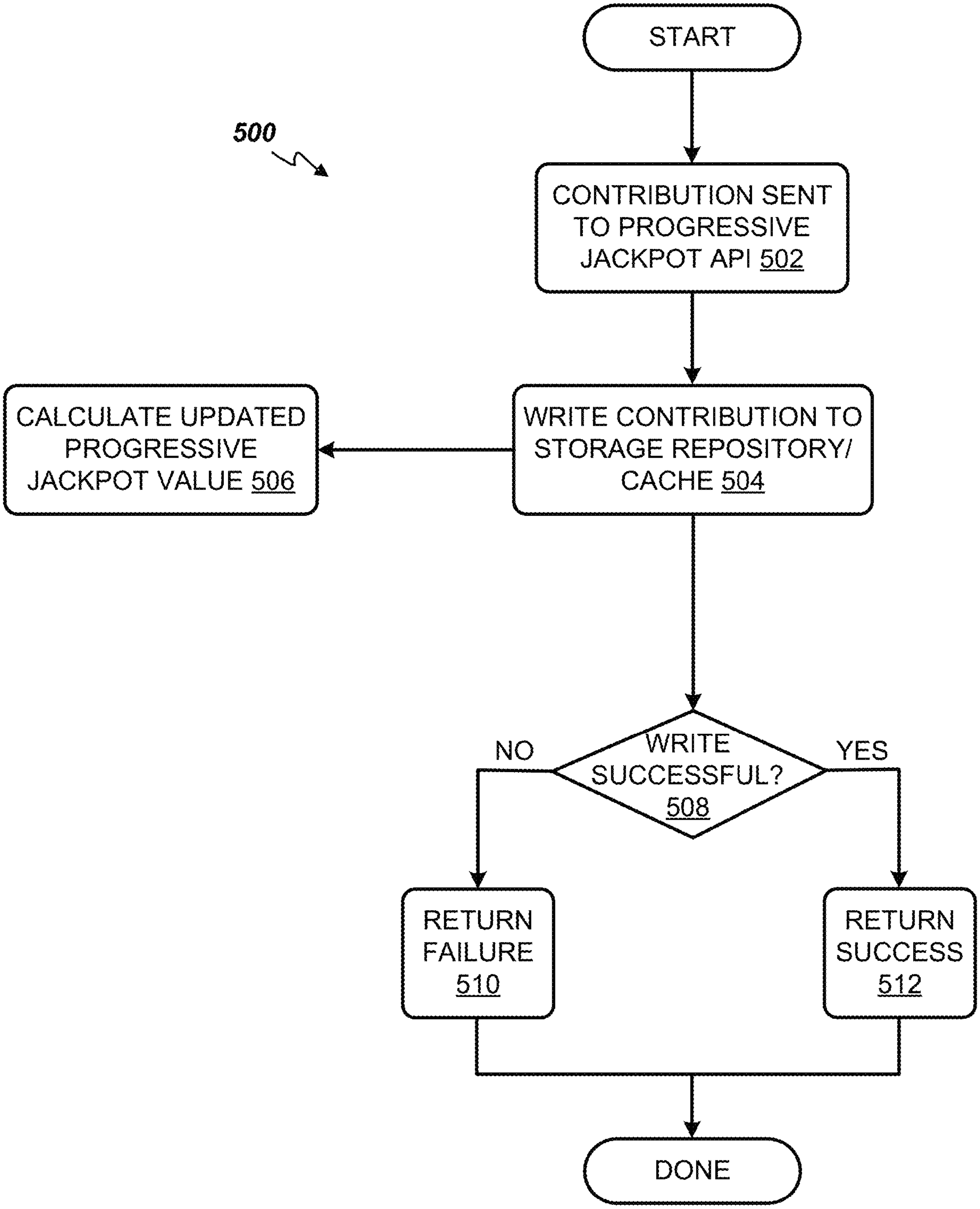
FIG. 5 illustrates, in process flow diagram form, an exemplary method of receiving, processing, and writing a progressive jackpot contribution to memory, in accordance with various implementations described herein.
Figure 6:
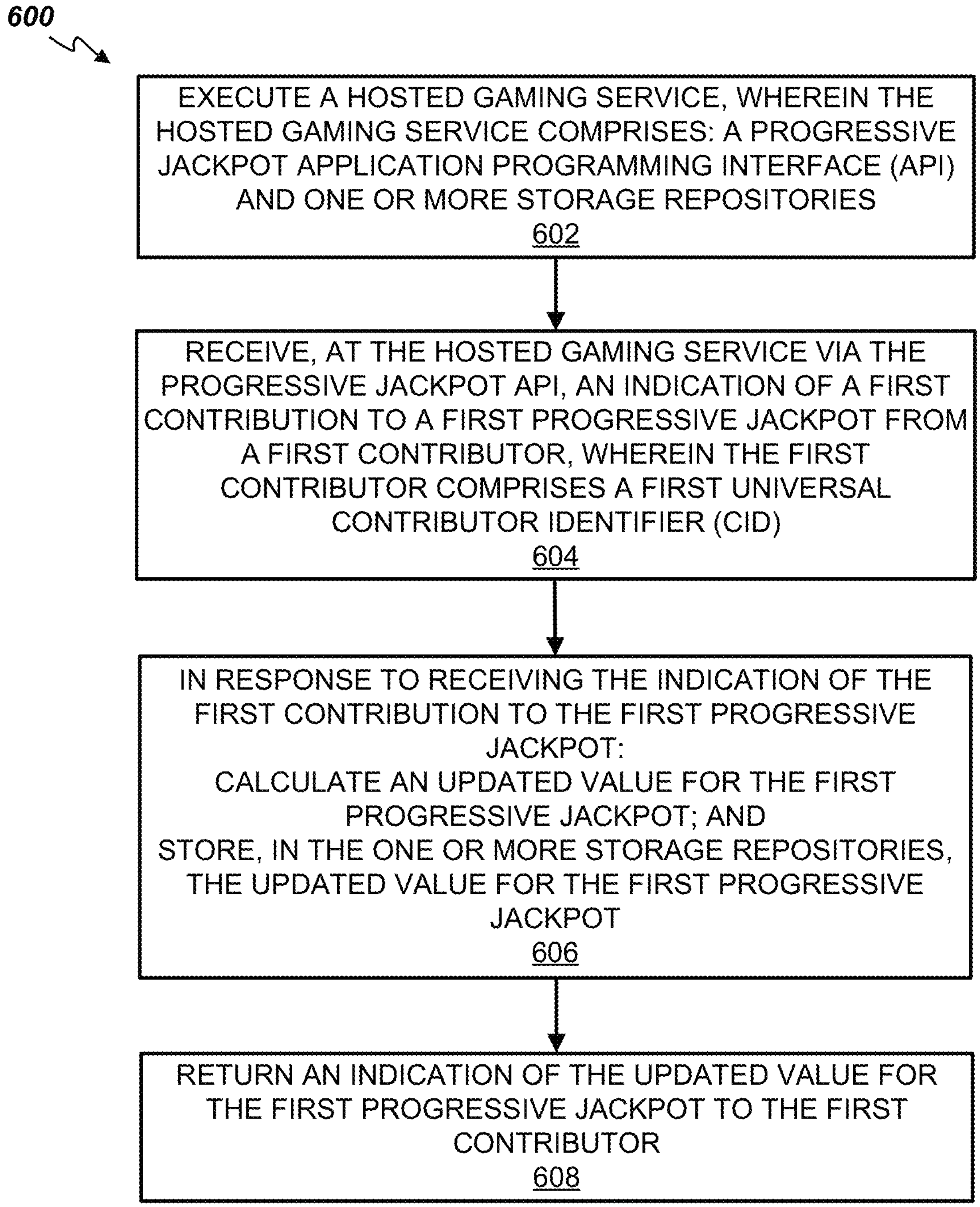
FIG. 6 is a flowchart illustrating an example method for performing an embodiment of the disclosed technology related to a hosted progressive jackpot gaming service.

Turning now to FIG. 4, an implementation 400 of a hosted gaming service comprising a progressive jackpot system is illustrated, in accordance with various implementations described herein. One or more players 401 may engage or interact with a game application client, e.g., via a land-based electronic gaming machine (EGM) such as EGM 410 or one or more end user devices, such as "iGaming" end user devices 264*a*/264*b*/264*c*. For example, in the case of FIG. 4, a player $\mathbf{401}_1$ is playing a game on a land-based EGM 410, while another player $\mathbf{401}_2$ is shown as playing a game on both the land-based EGM 410, as well as various iGaming end user devices 264*a*/264*b*/264*c*. FIG. 4 illustrates the point that, at different times, the same human player may access one or more games via different gaming ecosystems. For example, player $\mathbf{401}_2$ may have played a Game A on EGM 410 on Saturday morning, and then played an "online" version of the same Game A on end user device 264*a* on Saturday night. During each playing session, player $\mathbf{401}_2$ may have contributed to one or more of the same progressive jackpots associated with Game A, as well as one or more personal progressive jackpots that are associated specifically with player $\mathbf{401}_2$.

Each game application client 410/264*a-c* may provide a player with access to one or more game frontends. For example, the game frontends may comprise frontend interfaces for different games, such as Buffalo Grand, Miss Kitty, Dragon Link, Five Dragons, etc. The game front ends, in addition to displaying information related to the game and storing relevant game-related content, may utilize a hosted gaming service comprising a progressive jackpot system 430 to take input information from the games that the player is playing (e.g., amount of bets, lines played, etc.) and pass it to the progressive jackpot API server 432, wherein various progressive jackpot calculation systems 434 and storage repositories 436 may be hosted.

As mentioned above, in the case of land-based EGMs, a hardware jackpot controller 412 may be employed to accurately track, monitor, and award progressive jackpot prizes in a closed-loop network. Such hardware jackpot controllers are typically specially-configured to perform functionality often required by stringent gaming regulations and may comprise, e.g., one or more calculation engines 414 and relational database management systems 416. As shown in FIG. 4, improved hardware jackpot controller 412 may also comprise a progressive jackpot API connector 418, allowing improved hardware jackpot controller 412 to convey its calculated and/or stored progressive jackpot values to and from the progressive jackpot system 430, e.g., such that the progressive jackpot values may be kept accurate and in sync across the various gaming devices, players, and ecosystems.

In the case of iGaming devices and other mobile or remote end user devices configured for the online play of games, a remote gaming system 402 may be employed to accurately track, monitor, and award progressive jackpot prizes for iGaming players and/or social gaming players. Such remote gaming systems may be specially-configured to perform functionality typically performed on standalone EGM devices and may comprise, e.g., a game development kit (GDK) 404 comprising one or more APIs for the execution of online games, one or more authentication services 406 (e.g., to validate player identities before contributions are made to progressive jackpots), and a progressive jackpot API connector 408, allowing the remote gaming system 402 to convey its calculated and/or stored progressive jackpot values to and from the progressive jackpot system 430, e.g., such that the progressive jackpot values may be kept accurate and in sync across the various iGaming devices, players, and ecosystems. (In some embodiments, authentication services 406 may be partially or wholly provided by a third-party authentication and/or authorization infrastructure provider.)

In some implementations, the transmission of information between the frontend components (e.g., 410/264) and the backend components (e.g., 430) of the hosted gaming environment may take place over one or more communication networks 420, such as over the Internet, through a website maintained by a computer on a remote server, or over an online data network, including commercial online service providers, Internet service providers, private networks (e.g., local area networks and enterprise networks), and the like (e.g., wide area networks).

According to some embodiments, a hosted gaming service 430 may be comprised of multiple APIs, whose purpose is to perform the math and/or execute the progressive jackpot logic of different games, as well as provide other services, such as storage, security, payout, and/or validation. One aim of the backend hosted gaming service 430 is to be able supply functionality to the games/players with horizontally-scalable services and the ability to operate across multiple platforms, technology stacks, machines, interfaces, etc. in a highly-accurate and auditable manner.

According to some embodiments, the progressive jackpot API may comprise one or more methods allowing authorized calling clients to, e.g.: get or create a new game profile, get or create a new progressive jackpot; get a list of all actively-monitored progressive jackpots; add a contribution to a particular progressive jackpot (e.g., from a particular contributor); get a value of a particular progressive jackpot; get or add contributions to a progressive jackpot based on a particular contributor identifier or progressive jackpot identifier; indicate that a particular progressive jackpot has been triggered; or validate a progressive jackpot.

According to some embodiments, a personal progressive jackpot may be employed that is tied to a particular player and able to span across multiple games, e.g., so as to entice such players to continue playing games and/or to play games from an iGaming device. In such embodiments, the personal progressive jackpot may increment based on that individual player's gameplay. In other embodiments, contributions may be made to the player's personal progressive jackpot, e.g., based on a player's loyalty to a particular casino or game, at random, or based on other marketing-related factors. In some such embodiments, the value of the personal progressive jackpot could even carry over to that player's play on EGMs, e.g., when they are playing in a casino. However, according to some embodiments, if the player does not play any games (or at least the games which have contributed to the personal progressive jackpot) for a certain amount of time, e.g., 3 months, 6 months, or a year of inactivity, then the contributions to their personal progressive jackpot may be "expired" (e.g., similarly to how vouchers can expire at a casino). The expiration time could be a predetermined or configurable value, and there could be reports to support the expiration, so that the company or casino making the contribution could recover that liability. Universal player accounts, e.g., that accounts span across different casino operators or jurisdictions, may be created and linked to social (or other free-to-play) gaming accounts, as well. Play across any of those gaming spaces could be used to increment the aforementioned personal progressive jackpots, subject to any desired expiration conditions, as described above.

III.C. Exemplary Progressive Jackpot API Details

As mentioned above, a progressive jackpot API may be deployed that handles various features and functionalities related to the improved progressive jackpot systems described herein. For example, the progressive jackpot API may comprise one or more methods allowing authorized calling clients to, e.g.: get or create a new game profile, get or create a new progressive jackpot; get a list of all actively-monitored progressive jackpots; add a contribution to a particular progressive jackpot (e.g., from a particular contributor); get a value of a particular progressive jackpot; get or add contributions to a progressive jackpot based on a particular contributor identifier or progressive jackpot identifier; indicate that a particular progressive jackpot has been triggered; or validate a progressive jackpot.

According to some embodiments, the progressive jackpot API may include a "game profile" object type that may be returned to (or added by) a calling program. An exemplary schema for a game profile object may include a listing of the names and types of progressive jackpots associated with the game profile, as well as various other tags, descriptors, and/or variation IDs used to describe the particular game. Each progressive jackpot may have its own set properties, such as reset value, increment rate, maximum value, etc. Each game profile may also define various so-called "variations" for which the game profile is valid. For example, the particular progressive jackpots defined for a particular game may be Variations 99, 1*c*, 2*c*, or 5*c*, and within the jurisdiction of Pennsylvania. In other words, the progressive jackpot system may use this information to add a particular device (e.g., an EGM or an iGaming device) to a particular progressive jackpot if the game profile matches with sufficient similarity (e.g., in terms of Variation, jurisdiction, etc.); and it may instead create a new progressive jackpot if it does not find a progressive jackpot matching with sufficient similarity.

According to some embodiments, the progressive jackpot API may include a "progressive jackpot" object type that may be returned to (or added by) a calling client program. An exemplary schema for a progressive jackpot object, according to some implementations, may include an identifier, name, level specification, rest value, increment rate, auto-approval limit, etc., for the particular progressive jackpot.

According to some embodiments, the progressive jackpot API may also include a "contributor" object type, which may include, e.g., a type of gaming environment that the contribution is coming from (e.g., RMG or social), the ID of the progressive jackpot that is being contributed to, the IDs of the player, game, and/or facility making the contribution, the initialization names and/or values of the particular jackpot, etc.

According to some embodiments, the progressive jackpot API may also include a "contribution" object type, which may include, e.g., an ID of the particular contributor making the contribution (e.g., a contributor having a contributor identifier value of "someone@someplace.com"), a contribution type, a wager amount, a progressive jackpot identifier to which the wager/contribution is being made, etc. The contributions by the particular contributor may be retrieved (or added to) using the exemplary API and object structures disclosed herein. In some implementations, contributions may also be retrieved by progressive jackpot identifier, if so desired.

As may now be appreciated, a progressive jackpot API (such as that described in detail above, in this Section) may speed up and simplify the process of matching progressive jackpots, linking progressive jackpot contributions to the correct progressive jackpot, and tracking player progressive jackpot contributions across various games, jackpots types, and play modalities over time—all in a seamless and secure fashion.

III.D. Handling Progressive Jackpot Contributions at a Hosted Gaming Service Turning now to FIG. 5, a process flow diagram 500 of an exemplary method of receiving, processing, and writing a progressive jackpot contribution to memory is illustrated, in accordance with various implementations described herein. At Step 502, a contribution may be sent to a hosted gaming service via a progressive jackpot API, e.g., from a particular contributor playing at an EGM or iGaming device. At Step 504 (e.g., once confirming that the contribution matches with sufficient similarity to progressive jackpot already being stored/managed by the hosted gaming service), the hosted gaming service may write the contribution to a storage repository (e.g., one or more relational databases) or in memory cache. If necessary, at Step 506 (e.g., in the event that the game the contributor is playing has not already calculated or determined what the updated progressive jackpot value should be), the hosted gaming service may calculate an updated progressive jackpot value, which may, e.g., be returned to the particular contributor, such that a visual display element within the game may be updated with the updated progressive jackpot value. According to some embodiments, the updated progressive jackpot may also be broadcast asynchronously by server code directly to a client-side web application, if desired.

If, at Step 508, the writing operation of Step 504 is successful (i.e., 'YES' at Step 508), then the process flow may proceed to Step 512 to return an indication of a successful progressive jackpot update operation. If, instead, at Step 508, the writing operation of Step 504 is unsuccessful (i.e., 'NO' at Step 508), then the process flow may proceed to Step 510 to return an indication of a failed progressive jackpot update operation.

III.E. Exemplary Methods for Utilizing a Hosted Flexible and Omnichannel Progressive Jackpot System Turning now to FIG. 6, a flowchart, illustrating an example method 600 for performing an embodiment of the disclosed technology related to a hosted progressive jackpot gaming service, is shown. First at Step 602, the method 600 may execute the hosted progressive jackpot gaming service, wherein the hosted gaming service comprises: a progressive jackpot API; and one or more storage repositories. Next, at Step 604, the method 600 may receive, at the hosted gaming service, e.g., via the progressive jackpot API, an indication of a first contribution to a first progressive jackpot from a first contributor, wherein the first contributor comprises a first universal contributor identifier (CID). Next, at Step 606 (e.g., once confirming that the first contribution matches with sufficient similarity to progressive jackpot already being stored/managed by the hosted progressive jackpot gaming service), the method 600 may, in response to receiving the indication of the first contribution to the first progressive jackpot: calculate an updated value for the first progressive jackpot; and store, in the one or more storage repositories, the updated value for the first progressive jackpot. Finally, if desired, at Step 608, the method 600 may return an indication of the updated value for the first progressive jackpot to the first contributor, e.g., such that a visual display element within the game (e.g., a virtual meter) may be updated with the updated progressive jackpot value.

Figure 7:
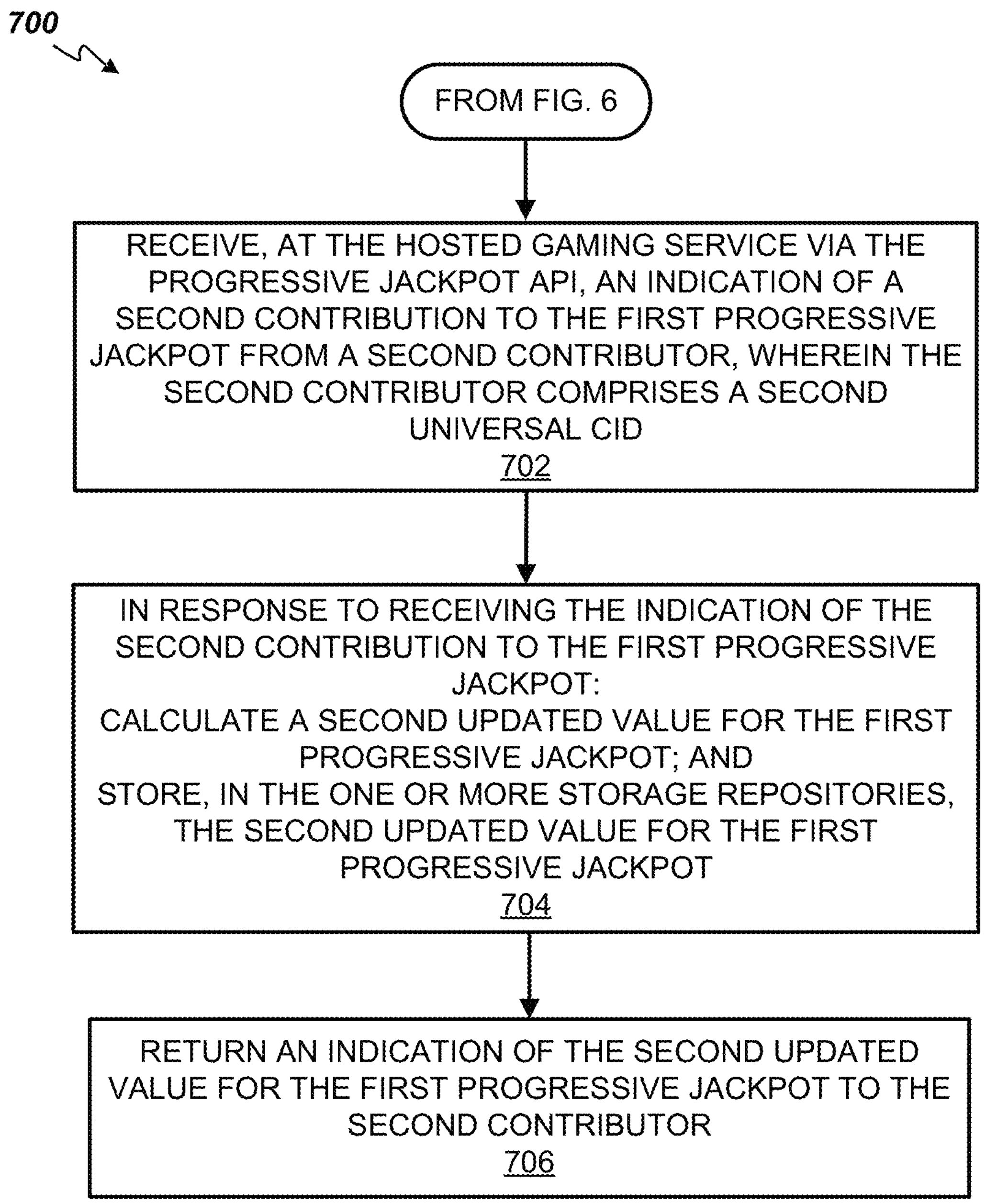
FIG. 7 is a flowchart illustrating another example method for performing an embodiment of the disclosed technology related to a hosted progressive jackpot gaming service.

Turning now to FIG. 7, a flowchart, illustrating another example method 700 for performing an embodiment of the disclosed technology related to a hosted progressive jackpot gaming service, is shown. In particular, method 700 depicts what happens when a second contributor contributes to the same first progressive jackpot referred to above in FIG. 6. First at 702, the method 700 may receive, at the hosted gaming service via the progressive jackpot API, an indication of a second contribution to the first progressive jackpot from a second contributor, wherein the second contributor comprises a second universal CID. Next, at Step 704, the method 700 may, in response to receiving the indication of the second contribution to the first progressive jackpot: calculate a second updated value for the first progressive jackpot; and store, in the one or more storage repositories, the second updated value for the first progressive jackpot. Finally, if desired, at Step 706, the method 700 may return an indication of the second updated value for the first progressive jackpot to the second contributor, e.g., such that a visual display element within the game (e.g., a virtual meter) may be updated with the second updated progressive jackpot value. If desired, the second updated progressive jackpot value may also be returned to the first contributor (and any other contributors for which the second updated value for the first progressive jackpot may be relevant).

Figure 8:
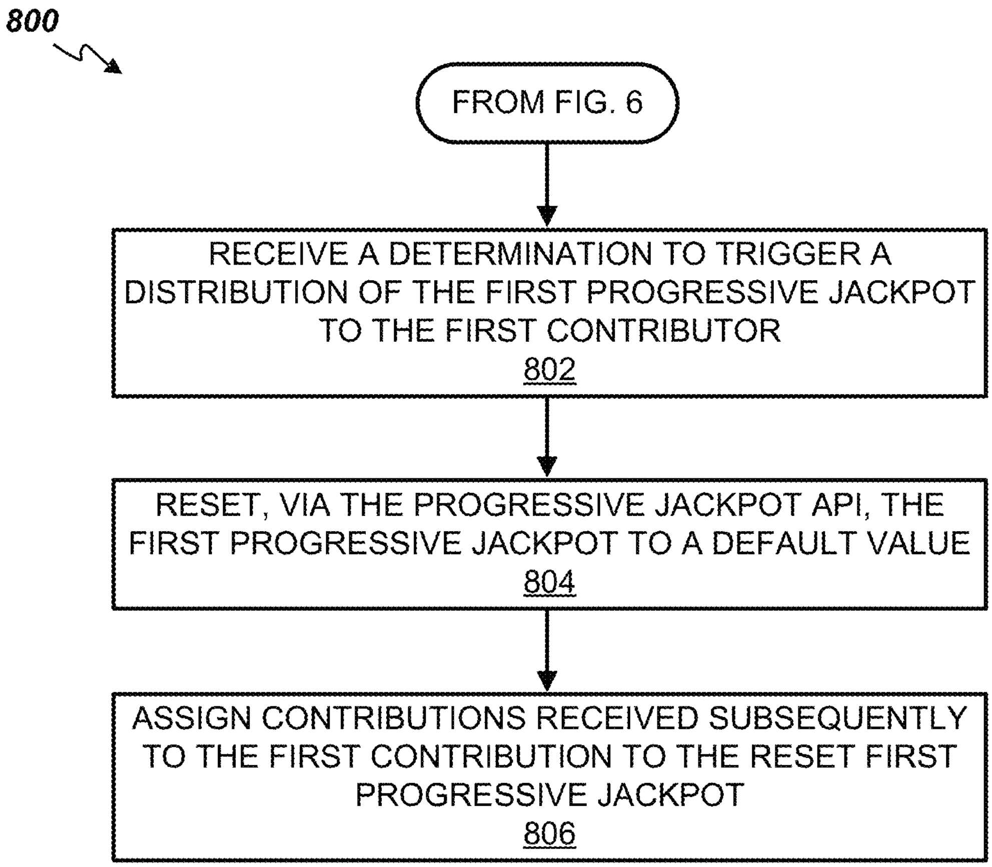
FIG. 8 is a flowchart illustrating an example method for performing an embodiment of the disclosed technology related to a hosted progressive jackpot gaming service processing the triggering of a progressive jackpot.

Turning now to FIG. 8, a flowchart, illustrating an example method 800 for performing an embodiment of the disclosed technology related to a hosted progressive jackpot gaming service processing the triggering of a progressive jackpot, is shown. First at Step 802, the method 800 may receive, e.g., at the hosted gaming service, a determination to trigger a distribution of the first progressive jackpot to the first contributor (wherein, e.g., the relevant game possessing the first progressive jackpot has made the determination that it is time to trigger a distribution of the first progressive jackpot). Next at Step 804, the method 800 may reset, via the progressive jackpot API, the first progressive jackpot to a default value and, at Step 806, assign contributions received subsequently to the first contribution to the reset first progressive jackpot value (e.g., to ensure that contributions received subsequently to the triggering of the first progressive jackpot are put towards the next progressive jackpot to be awarded and are not accidentally also awarded to the first contributor).

III.F. Exemplary Hosted Unified Jackpot System

Figure 9:
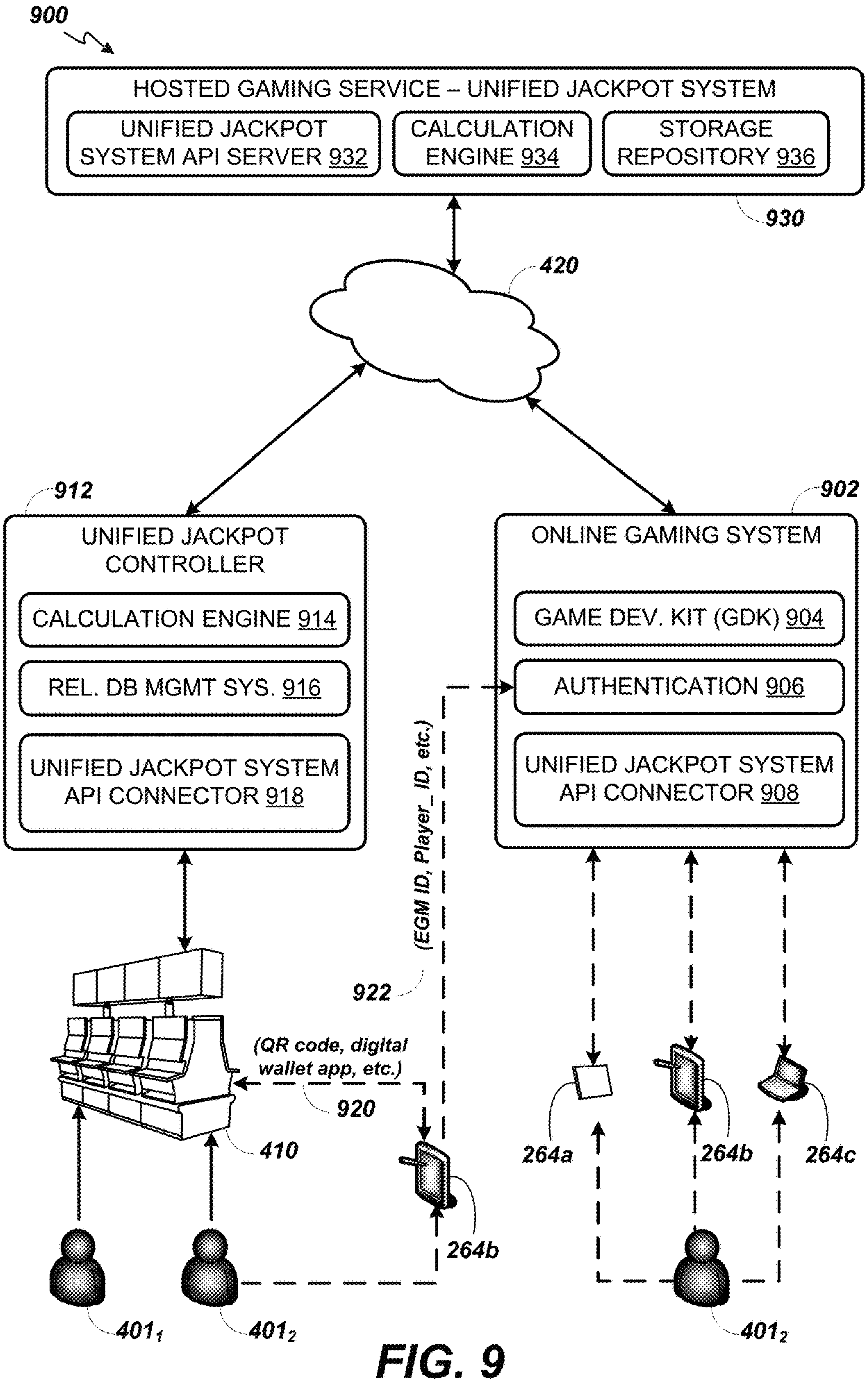
FIG. 9 illustrates, in block diagram form, an implementation of a hosted gaming service comprising a unified jackpot system, in accordance with various implementations described herein.

Turning now to FIG. 9, an implementation 900 of a hosted gaming service comprising a unified jackpot system is illustrated, in accordance with various implementations described herein. One or more players 401 may engage or interact with a game application client, e.g., via a land-based electronic gaming machine (EGM) such as EGM 410 or one or more end user devices, such as "iGaming" end user devices **264*a*/264*b*/264*c*. For example, in the case of FIG. 9, a player $\mathbf{401}_1$ is playing a game on a land-based EGM 410, while another player $\mathbf{401}_2$ is shown as playing a game on both the land-based EGM 410, as well as various iGaming end user devices 264*a*/264*b*/264*c*. FIG. 9 illustrates the point that, at different times (or even at the same time), the same human player may access one or more games via different gaming ecosystems. For example, player $\mathbf{401}_2$ may have played a Game A on EGM 410 on Saturday morning, and then played an "online" version of the same Game A (or a different game) on end user device 264*a*** on Saturday night. During each playing session, player $\mathbf{401}_2$ may have been awarded one or more jackpots that are associated specifically with player $\mathbf{401}_2$.

Each game application client **410/264*a-c* may provide a player with access to one or more game frontends. The game front ends, in addition to displaying information related to the game and storing relevant game-related content, may utilize a hosted gaming service comprising a unified jackpot system 930 to take input information from the games that the player is playing (e.g., player ID or contributor ID, gaming device ID, amount of bets, time played, etc.) and pass it to the unified jackpot system API server 932, wherein various jackpot award calculation engines 934 and storage repositories 936** may be hosted.

In the case of land-based EGMs, a unified jackpot controller 912 (e.g., a hardware device, such as an Internet of Things (IoT) device, or other device as described in the '769 application) may be employed to accurately track, monitor, and award jackpot prizes to players, i.e., in essentially a closed-loop network. Such unified jackpot controllers are typically specially configured to perform functionality often required by gaming regulations and may comprise, e.g., one or more calculation engines 914 and relational database management systems 916. As shown in FIG. 9, improved unified jackpot controller 912 may also comprise a unified jackpot API connector 918, allowing improved unified jackpot controller 912 to convey its calculated and/or stored jackpot values to and from the unified jackpot system 430, e.g., such that each player's jackpot award values may be kept accurate and in sync across the various gaming devices, players, and ecosystems.

In the case of iGaming devices and other mobile or remote end user devices configured for the online play of games, an online gaming system 902 may be employed to accurately track, monitor, and award jackpot prizes for iGaming players and/or social gaming players. Such remote gaming systems may be specially-configured to perform functionality typically performed on standalone EGM devices and may comprise, e.g., a game development kit (GDK) 904 comprising one or more APIs for the execution of online games, one or more authentication services 906 (e.g., to validate player identities before jackpots are awarded to particular players), and a unified jackpot system API connector 908, allowing the online gaming system 902 to convey player and/or gaming device-related information to and from the unified jackpot system 930, e.g., such that the jackpot values may be kept accurate and in sync across the various iGaming devices, players, and ecosystems. (In some embodiments, authentication services 906 may be partially or wholly provided by a third-party authentication and/or authorization infrastructure provider.)

In some embodiments, the unified jackpot controller 912 may be configured to collect and send player data (e.g., via the "G2S" protocol) from active listening devices to a hosted gaming service, such as unified jackpot system 930, via communication network 420. As described herein, the data collection process may be CMS-agnostic. According to some embodiments the gameplay session data may be player anonymous by default. In other words, the gameplay session data would need to be linked to a particular player account before the gameplay session could award jackpot prizes to the particular player based on their play of the game.

In some such embodiments, as shown at arrow 920, the player account may be linked to the anonymous gameplay session data using a digital wallet or other application running on a mobile device of the player (e.g., mobile device 264*b* of player $\mathbf{401}_2$). In other embodiments, player $\mathbf{401}_2$ could scan a QR code affixed to (or displayed upon a display of) EGM 410 using their mobile device 264*b*, allowing their mobile to device to connect to the EGM 410 and/or to obtain relevant information related to EGM, such as an identifier for the EGM gaming device. As shown at arrow 922, the player's mobile device mobile device 264*b* can then pass the EGM identifier and the player's universal CID (or other form of identifier) to the authentication service 906 of the online gaming system 902. In other embodiments, the EGM 410 may be configured to send the player identification information directly (or indirectly, e.g., via a CMS or other IoT device with Internet access) to the online gaming system 902, e.g., if the player has identified themselves to the EGM 410 via a player loyalty card, QR code, biometric scan, data input entry, or the like. In other embodiments, the player identification information may come from a Slot Machine Interface Board (SMIB) or other device that is CMS-specific. Once the player is authenticated, the data linking the player to the particular gaming device for the current gameplay session (e.g., EGM 410, in this example) may then be transmitted to the unified jackpot system 930.

The unified jackpot system 930 may then begin to link the previously-anonymous player data (e.g., as received from a unified jackpot controller 912) with the player account indicated in the data received from the mobile device (e.g., mobile device 264*b* of player $\mathbf{401}_2$ in this example). At the unified jackpot system 930, the gameplay session data linked with the player's universal CID can be used by calculation engine 934 and the results of changes in value to the player's jackpot account over time may be tracked in storage repository 936.

According to some embodiments, the unified jackpot system 930 may leverage one or more APIs (e.g., executing on unified jackpot system API server 932) that includes the specification of various parameters, such as a jackpot identifier (ID), universal contributor ID, and/or contributor type that allow the unified jackpot 930 to accurately tracking and accounting for player-specific jackpot accounts-even if more than one are simultaneously active for the same player. In some such implementation, the universal contributor ID may identify the player/player account that is currently contributing to the player's jackpot account(s). The contributor ID could be an assigned universal identifier to be used across different gaming environments, or it could comprise an identifier that is linked to a land-based player account, online gaming account, and/or digital wallet account. In such cases, a contributor type parameter could represent the gaming platform (e.g., online or land-based casino) the contribution is made from. With these parameters, the unified jackpot system 930 can track, monitor, and award jackpot prizes to different types of gaming device across different gaming ecosystems and/or different designated games.

In some implementations, the transmission of information between the frontend components (e.g., 410/264) and the backend components (e.g., 930) of the hosted gaming environment may take place over one or more communication networks 420, such as over the Internet, through a website maintained by a computer on a remote server, or over an online data network, including commercial online service providers, Internet service providers, private networks (e.g., local area networks and enterprise networks), and the like (e.g., wide area networks).

According to some embodiments, a hosted gaming service 930 may be comprised of multiple APIs, whose purpose is to perform the math and/or execute the jackpot awarding logic of different games, as well as provide other services, such as storage, security, payout, and/or validation. One aim of the backend hosted gaming service 930 is to be able supply functionality to the games/players with horizontally-scalable services and the ability to operate across multiple platforms, technology stacks, machines, interfaces, etc. in a highly-accurate and auditable manner.

According to some embodiments, one or more personal jackpot award accounts may be employed that are tied to a particular player and able to span across multiple games, e.g., so as to entice such players to continue playing games and/or to play games from an iGaming device. In such embodiments, jackpot prizes may be awarded based on that individual player's gameplay. In other embodiments, jackpots may be awarded to a player, e.g., based on a player's loyalty to a particular casino or game, at random, or based on other marketing-related factors. In some such embodiments, the value of the player's jackpot accounts could even carry over to that player's play on different EGMs, e.g., when they are playing in a casino. However, according to some embodiments, if the player does not play any games (or at least the games which have contributed jackpot awards) for a certain amount of time, e.g., 3 months, 6 months, or a year of inactivity, then certain of the jackpot awards may be "expired" (e.g., similarly to how vouchers can expire at a casino). The expiration time could be a predetermined or configurable value. Universal player accounts, e.g., that accounts span across different casino operators or jurisdictions, may be created and linked to social (or other free-to-play) gaming accounts, as well. Play across any of those gaming spaces could result in a player being awarded jackpot prizes, subject to any desired expiration conditions, as described above.

III.G. Handling Unified Jackpot Awards at a Hosted Gaming Service

Figure 10:
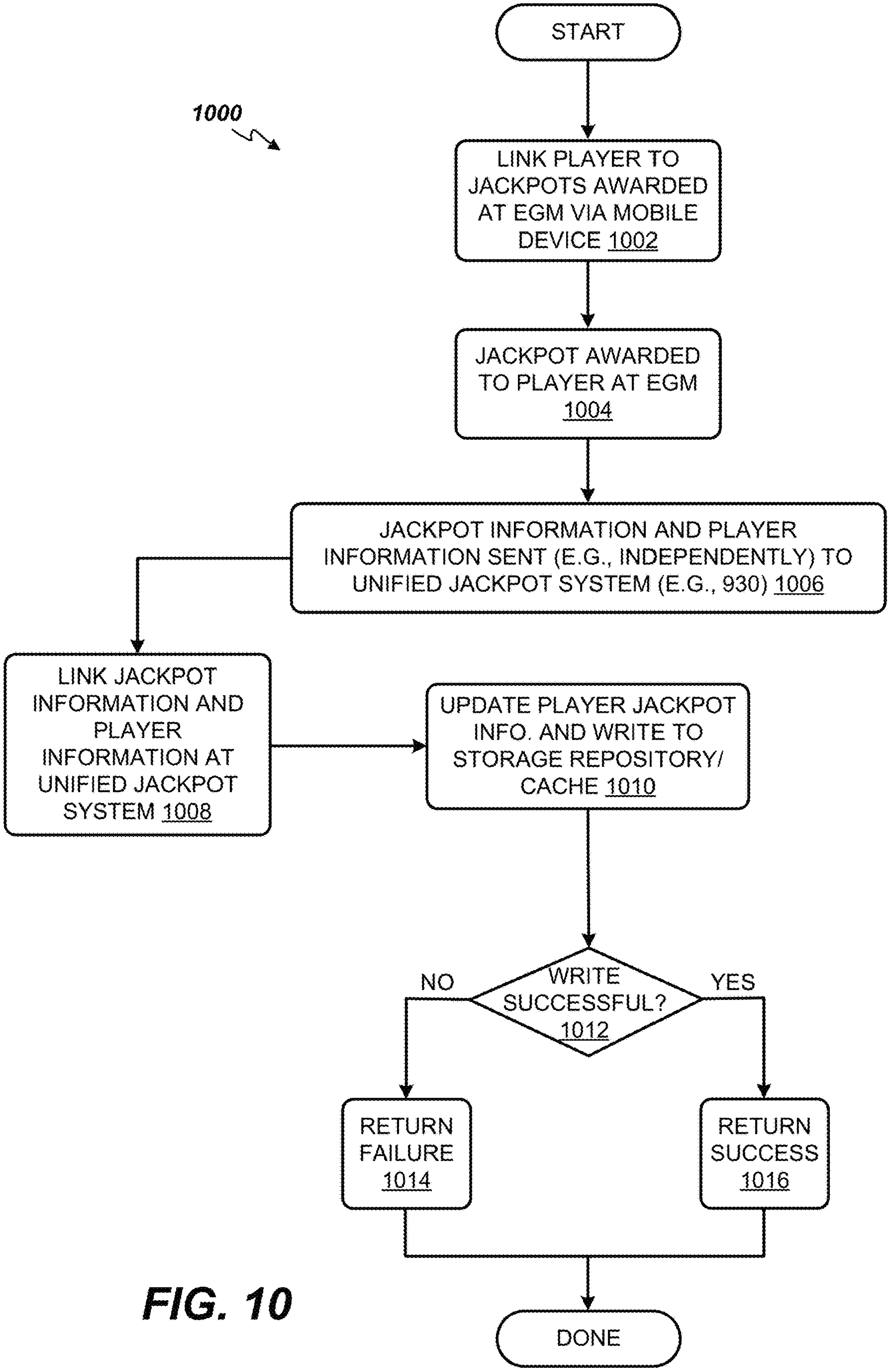
FIG. 10 illustrates, in process flow diagram form, an exemplary method of receiving, processing, and writing a jackpot award to memory, in accordance with various implementations described herein.
Figure 11:
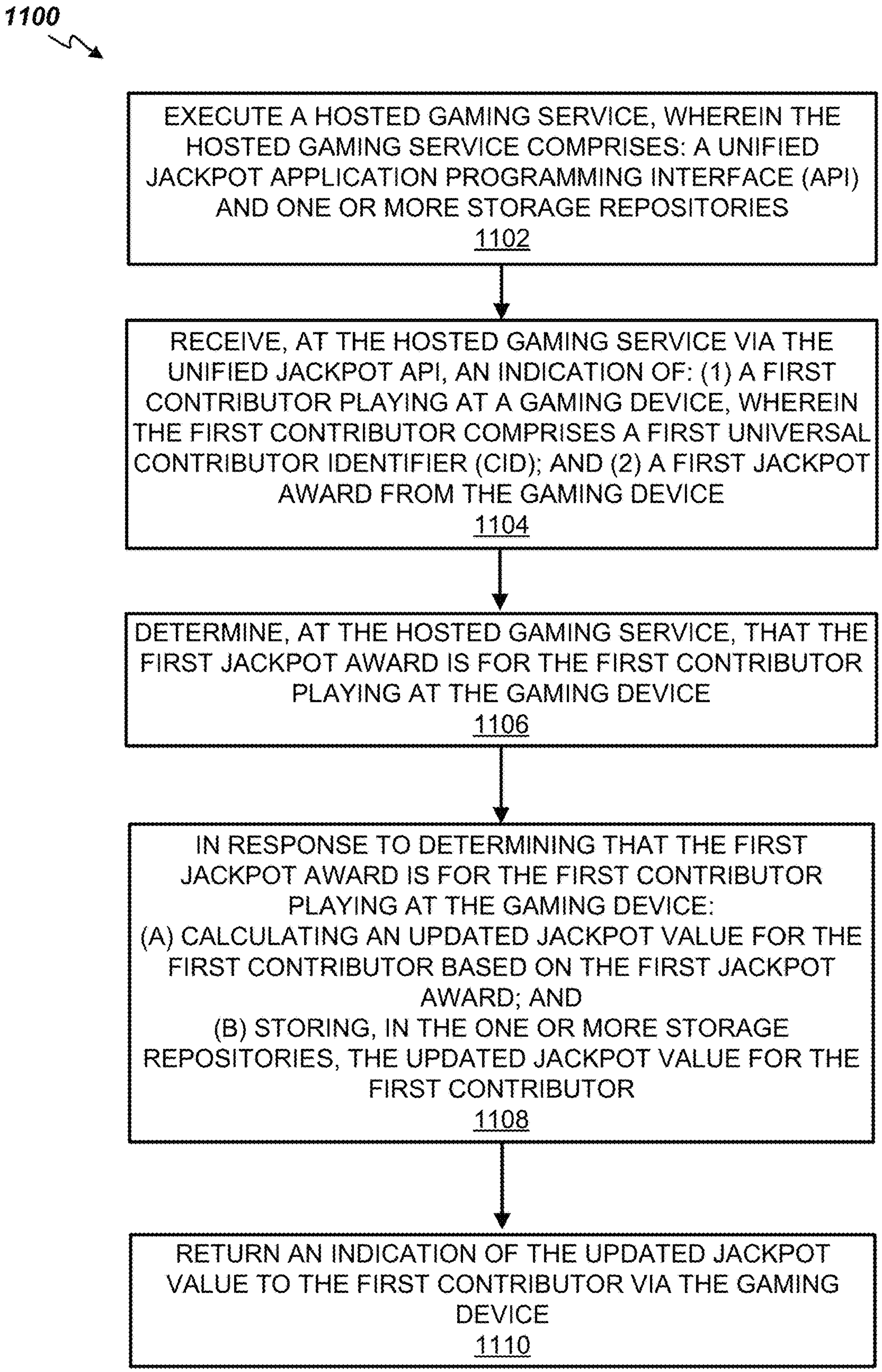
FIG. 11 is a flowchart illustrating an example method for performing an embodiment of the disclosed technology related to a hosted unified jackpot gaming service.

Turning now to FIG. 10, a process flow diagram 1000 of an exemplary method of receiving, processing, and writing a player jackpot award to memory is illustrated, in accordance with various implementations described herein. At Step 1002, a particular contributor may link his or her player account to a particular EGM (e.g., via a mobile device sending the player's ID as well as athe EGM's ID to the unified jackpot system, such as discussed above with reference to FIG. 9). In some embodiments, the unified jackpot system may transmit a message to the EGM, indicating the universal identifier (e.g., player ID, CID, etc.) of the player that is currently playing at the EGM. At 1004, the game being played at the EGM may determine to award the player a jackpot prize.

At Step 1006, information regarding the jackpot prize (e.g., it's amount, it's type, etc.) and information regarding the player's identity may be sent to the unified jackpot system. In some implementations, the EGM may already have been informed of the universal identifier of the player who is currently playing, so the EGM may send the information regarding the jackpot prize and the information regarding the player's identify to the unified jackpot system. In other implementations, the EGM may send the information regarding the jackpot prize to the unified jackpot system, while the information regarding the player's identify may be sent to the unified jackpot system from a different source (e.g., a mobile device owned or operated by the players) and/or at a different time, such as during the game play session or after the conclusion of the game play session, i.e., to officially link any jackpot prizes earned during the game play session to the player who earned them.

At Step 1008, the unified jackpot system may take the CMS-agnostic jackpot information that has been uploaded via the cloud and link the gaming data to the appropriate player identifier (e.g., player ID, CID, or the like). In some implementations, a CID may be associated with a player-specific jackpot account (e.g., a particular type of jackpot, a jackpot that is earned in a particular game, etc.). The CID may also be used to link a player across different gaming ecosystems. Once linked, the unified jackpot system can use an API to track jackpots earned by a particular player across multiple gaming environments.

At Step 1010, the hosted gaming service may write the player-specified jackpot information to a storage repository (e.g., one or more relational databases) or in memory cache. If necessary, at Step 1010 (e.g., in the event that the game the unified jackpot system has not already calculated or determined what the updated value of the player's relevant jackpot account should be), the hosted gaming service may calculate an updated jackpot account value, which may, e.g., be returned to the gaming device that the particular player is playing on, such that a visual display element within the game may be updated with the updated jackpot account value. According to some embodiments, the updated jackpot account value may also be broadcast asynchronously by server code directly to a client-side web application, if desired.

If, at Step 1012, the writing operation of Step 1010 is successful (i.e., 'YES' at Step 1012), then the process flow may proceed to Step 1016 to return an indication of a successful player-specific jackpot account update operation. If, instead, at Step 1012, the writing operation of Step 1010 is unsuccessful (i.e., 'NO' at Step 1012), then the process flow may proceed to Step 1014 to return an indication of a failed player-specific jackpot account update operation.

III.H. Exemplary Methods for Utilizing a Hosted Omnichannel Unified Jackpot System Turning now to FIG. 11, a flowchart, illustrating an example method 1100 for performing an embodiment of the disclosed technology related to a hosted unified jackpot gaming service, is shown. First at Step 1102, the method 1100 may execute the hosted progressive jackpot gaming service, wherein the hosted gaming service comprises: a unified jackpot API; and one or more storage repositories. Next, at Step 1104, the method 1100 may receive, at the hosted gaming service, e.g., via the unified jackpot API, an indication of: (1) a first contributor playing at a gaming device, wherein the first contributor comprises a first universal contributor identifier (CID); and (2) a first jackpot award from the gaming device. Next, at Step 1106, the method 1100 may determine, at the hosted gaming service, that the first jackpot award is for the first contributor playing at the gaming device. As described above, the determination at Step 1106 may involve the unified jackpot system linked a player ID or universal CID to the particular gaming device that the particular player is currently engaged in a gaming session on.

Next, at Step 1108 (e.g., in response to determining that the first jackpot award is for the first contributor playing at the gaming device), the method 1100 may: (a) calculate an updated jackpot value for the first contributor based on the first jackpot award; and (b) store, in the one or more storage repositories, the updated jackpot value for the first contributor. Finally, if desired, at Step 1110, the method 1100 may return an indication of the updated jackpot value to the first contributor via the gaming device, e.g., such that a visual display element within the game (e.g., a virtual meter) on the gaming device may be updated with the jackpot award's new value (and/or the indication that a particular jackpot award has been distributed to the player, i.e., as opposed to a persistent jackpot account that has simply accrued additional jackpot value/points, but has not yet been distributed to the player).

IV. Alternatives, Variations, and Conclusion

Numerous embodiments are described in this disclosure and are presented for illustrative purposes only. The described embodiments are not, and are not intended to be, limiting in any sense. The present disclosure is widely applicable to numerous embodiments, as is readily apparent from the disclosure. One of ordinary skill in the art will recognize that the innovations described herein may be practiced with various modifications and alterations, such as structural, logical, software, and electrical modifications. Although particular features of the innovations described herein may be described with reference to one or more particular embodiments and/or drawings, it should be understood that such features are not limited to usage in the one or more particular embodiments or drawings with reference to which they are described, unless expressly specified otherwise.

The present disclosure is neither a literal description of all embodiments nor a listing of features of the innovations described herein that must be present in all embodiments.

The Title (set forth at the beginning of the first page of this disclosure) is not to be taken as limiting in any way as the scope of the disclosed embodiments.

When an ordinal number (such as "first," "second," "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget." Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When introducing elements of aspects of the present disclosure or embodiments thereof, the articles "a," "an," "the," and "said" are intended to mean that there are one or more of the elements. The terms "comprising," including,"

and "having" are intended to be inclusive and mean that there may be additional elements other than the listed elements.

When a single device, component, structure, or article is described herein, more than one device, component, structure or article (whether or not they cooperate) may alternatively be used in place of the single device, component or article that is described. Accordingly, the functionality that is described as being possessed by a device may alternatively be possessed by more than one device, component or article (whether or not they cooperate).

Similarly, where more than one device, component, structure, or article is described herein (whether or not they cooperate), a single device, component, structure, or article may alternatively be used in place of the more than one device, component, structure, or article that is described. For example, a plurality of computer-based devices may be substituted with a single computer-based device. Accordingly, the various functionality that is described as being possessed by more than one device, component, structure, or article may alternatively be possessed by a single device, component, structure, or article.

The functionality and/or the features of a single device that is described may be alternatively embodied by one or more other devices that are described but are not explicitly described as having such functionality and/or features. Thus, other embodiments need not include the described device itself, but rather can include the one or more other devices which would, in those other embodiments, have such functionality/features.

Further, the systems and methods described herein are not limited to the specific embodiments described herein but, rather, operations of the methods and/or components of the system and/or apparatus may be utilized independently and separately from other operations and/or components described herein. Further, the described operations and/or components may also be defined in, or used in combination with, other systems, methods, and/or apparatus, and are not limited to practice with only the systems, methods, and storage media as described herein.

Devices that are in communication with each other need not be in continuous communication with each other, unless expressly specified otherwise. On the contrary, such devices need only transmit to each other as necessary or desirable, and they may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components and/or features are required. On the contrary, a variety of optional components are described to illustrate the wide variety of possible embodiments of the innovations described herein. Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the innovations described herein, and does not imply that the illustrated process is preferred.

Although a process may be described as including a plurality of steps, that does not indicate that all or even any of the steps are essential or required. Various other embodiments within the scope of the present disclosure include other processes that omit some or all of the described steps. Unless otherwise specified explicitly, no step is essential or required.

Although a product may be described as including a plurality of components, aspects, qualities, characteristics and/or features, that does not indicate that all of the plurality are essential or required. Various other embodiments within the scope of the present disclosure include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

Headings of sections provided in this disclosure are for convenience only and are not to be taken as limiting the disclosure in any way.

For the sake of presentation, the detailed description uses terms like "determine" and "select" to describe computer operations in a computer system. These terms denote operations performed by a computer and should not be confused with acts performed by a human being. The actual computer operations corresponding to these terms vary depending on implementation. For example, "determining" something can be performed in a variety of manners, and therefore the term "determining" (and like terms) can indicate calculating, computing, deriving, looking up (e.g., in a table, database or data structure), ascertaining, recognizing, and the like.

As used herein, the term "send" denotes any way of conveying information from one component to another component, and the term "receive" denotes any way of getting information at one component from another component. The two components can be part of the same computer system or different computer systems. The information can be passed by value (e.g., as a parameter of a message or function call) or passed by reference (e.g., in a buffer). Depending on context, the information can be communicated directly between the two components or be conveyed through one or more intermediate components. As used herein, the term "connected" denotes an operable communication link between two components, which can be part of the same computer system or different computer systems. The operable communication link can be a wired or wireless network connection, which can be direct or pass through one or more intermediate components (e.g., of a network). Communication among computers and devices may be encrypted to ensure privacy and prevent fraud in any of a variety of ways well known in the art.

It will be readily apparent that the various methods and algorithms described herein may be implemented by, e.g., appropriately programmed general-purpose computers and computing devices. Typically, a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer readable media) in a number of manners. In some embodiments, hard-wired circuitry or custom hardware may be used in place of, or in combination with, software instructions for implementation of the processes of various embodiments. Thus, embodiments are not limited to any specific combination of hardware and software. Accordingly, a description of a process likewise describes at least one apparatus for performing the process, and likewise describes at least one computer-readable medium for performing the process. The apparatus that performs the process can include components and devices (e.g., a processor, input and output devices) appropriate to perform the process. A computer-readable medium can store program elements appropriate to perform the method.

The term "computer-readable medium" refers to any non-transitory storage or memory that may store computer-executable instructions or other data in a computer system and be read by a processor in the computer system. A computer-readable medium may take many forms, including but not limited to non-volatile storage or memory (such as optical or magnetic disk media, a solid-state drive, a flash drive, PROM, EPROM, and other persistent memory) and volatile memory (such as DRAM). The term "computer-readable media" excludes signals, waves, and wave forms or other intangible or transitory media that may nevertheless be readable by a computer.

The present disclosure provides, to one of ordinary skill in the art, an enabling description of several embodiments and/or innovations. Some of these embodiments and/or innovations may not be claimed in the present application, but they may nevertheless be claimed in one or more continuing applications that claim the benefit of priority of the present application. Applicants may file additional applications to pursue patents for subject matter that has been disclosed and enabled but not claimed in the present application.

The foregoing description discloses only exemplary embodiments of the present disclosure. Modifications of the above disclosed apparatus and methods which fall within the scope of the present disclosure will be readily apparent to those of ordinary skill in the art. For example, although the examples discussed above are illustrated for a gaming market, embodiments of the present disclosure can be implemented for other markets. The gaming system environment of the examples is not intended to suggest any limitation as to the scope of use or functionality of any aspect of the disclosure.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

While the disclosure has been described with respect to the figures, it will be appreciated that many modifications and changes may be made by those skilled in the art without departing from the spirit of the disclosure. Any variation and derivation from the above description and figures are included in the scope of the present disclosure as defined by the claims.

What is claimed is:

1. A system, comprising:
- one or more processors;
- memory; and
- control logic, implemented using the one or more processors and memory, configured to perform operations, comprising:
  - executing a hosted gaming service, wherein the hosted gaming service comprises: a unified jackpot application programming interface (API); and one or more storage repositories;
  - receiving, at the hosted gaming service via the unified jackpot API, an indication of: (1) a first contributor playing at a gaming device, wherein the first contributor comprises a first universal contributor identifier (CID), wherein the indication of the first contributor playing at the gaming device is received, at the hosted gaming service, via a second gaming device that the first contributor is not currently playing at, and wherein the indication comprises a transmission of an identifier of the gaming device from the second gaming device to the hosted gaming service; and (2) a first jackpot award from the gaming device;
  - determining, at the hosted gaming service, that the first jackpot award is for the first contributor playing at the gaming device;
  - in response to determining that the first jackpot award is for the first contributor playing at the gaming device:
    - (a) calculating an updated jackpot value for the first contributor based on the first jackpot award; and
    - (b) storing, in the one or more storage repositories, the updated jackpot value for the first contributor; and
  - returning an indication of the updated jackpot value to the first contributor via the gaming device.

2. The system of claim 1, wherein the first universal CID comprises one or more of: a partner ID; game ID; player ID; or an electronic gaming machine (EGM) ID.

3. The system of claim 2, wherein the first universal CID comprises a concatenation of two or more of: a partner ID; game ID; or a player ID.

4. The system of claim 1, wherein the first contributor further comprises a contributor type property.

5. The system of claim 1, wherein the gaming device comprises an electronic gaming machine (EGM), and wherein the second gaming device comprises a personal electronic device associated with the first contributor.

6. The system of claim 1, wherein the indication of the first contributor playing at the gaming device further comprises a transmission of an identifier of the gaming device to the hosted gaming device.

7. The system of claim 6, wherein a second electronic device obtains an indication of the identifier of the gaming device from the gaming device and transmits the identifier of the gaming device to the hosted gaming service.

8. The system of claim 1, wherein, in response to receiving the indication of the first contributor playing at the gaming device, the operations that the control logic is configured to perform further comprise:
- transmitting, from the hosted gaming service to the gaming device, an indication that the first contributor is playing at the gaming device.

9. The system of claim 1, wherein at least a portion of the first jackpot award is configured to expire after a predetermined or configurable interval of inactivity by the first contributor.

10. The system of claim 1, wherein the first jackpot award comprises one or more of:

an award having a monetary value based on game play by the first contributor;

an award having a monetary value that is not based directly on game play by the first contributor;

an award having a non-monetary value based on game play by the first contributor; or an award having a non-monetary value that is not based directly on game play by the first contributor.

11. The system of claim 1, wherein the control logic is further configured to perform operations, comprising:

receiving, at the hosted gaming service via the unified jackpot API and subsequently to receiving (1) and (2) above, an indication of: (3) the first contributor further playing at a second gaming device, wherein the second gaming device comprises a personal electronic device; and (4) a second jackpot award from the second gaming device;

determining, at the hosted gaming service, that the second jackpot award is for the first contributor playing at the second gaming device;

in response to determining that the second jackpot award is for the first contributor playing at the second gaming device:

(c) calculating an updated jackpot value for the first contributor based on the second jackpot award; and (d) storing, in the one or more storage repositories, the updated jackpot value for the first contributor; and returning an indication of the updated jackpot value to the first contributor via the gaming device and the second gaming device.

12. A method for providing a hosted unified jackpot system for game players, the method comprising:

executing a hosted gaming service, wherein the hosted gaming service comprises: a unified jackpot API; and one or more storage repositories;

receiving, at the hosted gaming service via the unified jackpot API, an indication of: (1) a first contributor playing at a gaming device, wherein the first contributor comprises a first universal CID, wherein the indication of the first contributor playing at the gaming device is received, at the hosted gaming service, via a second gaming device that the first contributor is not currently playing at, and wherein the indication comprises a transmission of an identifier of the gaming device from the second gaming device to the hosted gaming service; and (2) a first jackpot award from the gaming device;

determining, at the hosted gaming service, that the first jackpot award is for the first contributor playing at the gaming device;

in response to determining that the first jackpot award is for the first contributor playing at the gaming device:

(a) calculating an updated jackpot value for the first contributor based on the first jackpot award; and (b) storing, in the one or more storage repositories, the updated jackpot value for the first contributor; and returning an indication of the updated jackpot value to the first contributor via the gaming device.

13. The method of claim 12, wherein the gaming device comprises an electronic gaming machine (EGM), and wherein the second gaming device comprises a personal electronic device associated with the first contributor.

14. The method of claim 12, wherein the second electronic device obtains the indication of the identifier of the gaming device from the gaming device.

15. One or more non-transitory computer-readable media storing computer-executable instructions, which, when executed by a computer, cause the computer to perform the following operations:

executing a hosted gaming service, wherein the hosted gaming service comprises: a unified jackpot API; and one or more storage repositories;

receiving, at the hosted gaming service via the unified jackpot API, an indication of: (1) a first contributor playing at a gaming device, wherein the first contributor comprises a first universal CID, wherein the indication of the first contributor playing at the gaming device is received, at the hosted gaming service, via a second gaming device that the first contributor is not currently playing at, and wherein the indication comprises a transmission of an identifier of the gaming device from the second gaming device to the hosted gaming service; and (2) a first jackpot award from the gaming device;

determining, at the hosted gaming service, that the first jackpot award is for the first contributor playing at the gaming device;

in response to determining that the first jackpot award is for the first contributor playing at the gaming device:

(a) calculating an updated jackpot value for the first contributor based on the first jackpot award; and (b) storing, in the one or more storage repositories, the updated jackpot value for the first contributor; and returning an indication of the updated jackpot value to the first contributor via the gaming device.

16. The one or more non-transitory computer-readable media of claim 15, wherein, in response to receiving the indication of the first contributor playing at the gaming device, the instructions further cause the computer to perform the following operations:

transmitting, from the hosted gaming service to the gaming device, an indication that the first contributor is playing at the gaming device.

17. The one or more non-transitory computer-readable media of claim 15, wherein the first jackpot award comprises one or more of:

an award having a monetary value based on game play by the first contributor;

an award having a monetary value that is not based directly on game play by the first contributor;

an award having a non-monetary value based on game play by the first contributor; or an award having a non-monetary value that is not based directly on game play by the first contributor.

18. The one or more non-transitory computer-readable media of claim 15, wherein the instructions further cause the computer to perform the following operations:

receiving, at the hosted gaming service via the unified jackpot API and subsequently to receiving (1) and (2) above, an indication of: (3) the first contributor further playing at a second gaming device, wherein the second gaming device comprises a personal electronic device; and (4) a second jackpot award from the second gaming device;

determining, at the hosted gaming service, that the second jackpot award is for the first contributor playing at the second gaming device;

in response to determining that the second jackpot award is for the first contributor playing at the second gaming device:

(c) calculating an updated jackpot value for the first contributor based on the second jackpot award; and (d) storing, in the one or more storage repositories, the updated jackpot value for the first contributor; and returning an indication of the updated jackpot value to the first contributor via the gaming device and the second gaming device.

* * * * *